Oct. 26, 1954 C. F. NEWBURG 2,692,693
ARTICLE HANDLING APPARATUS
Filed April 13, 1950 10 Sheets-Sheet 2
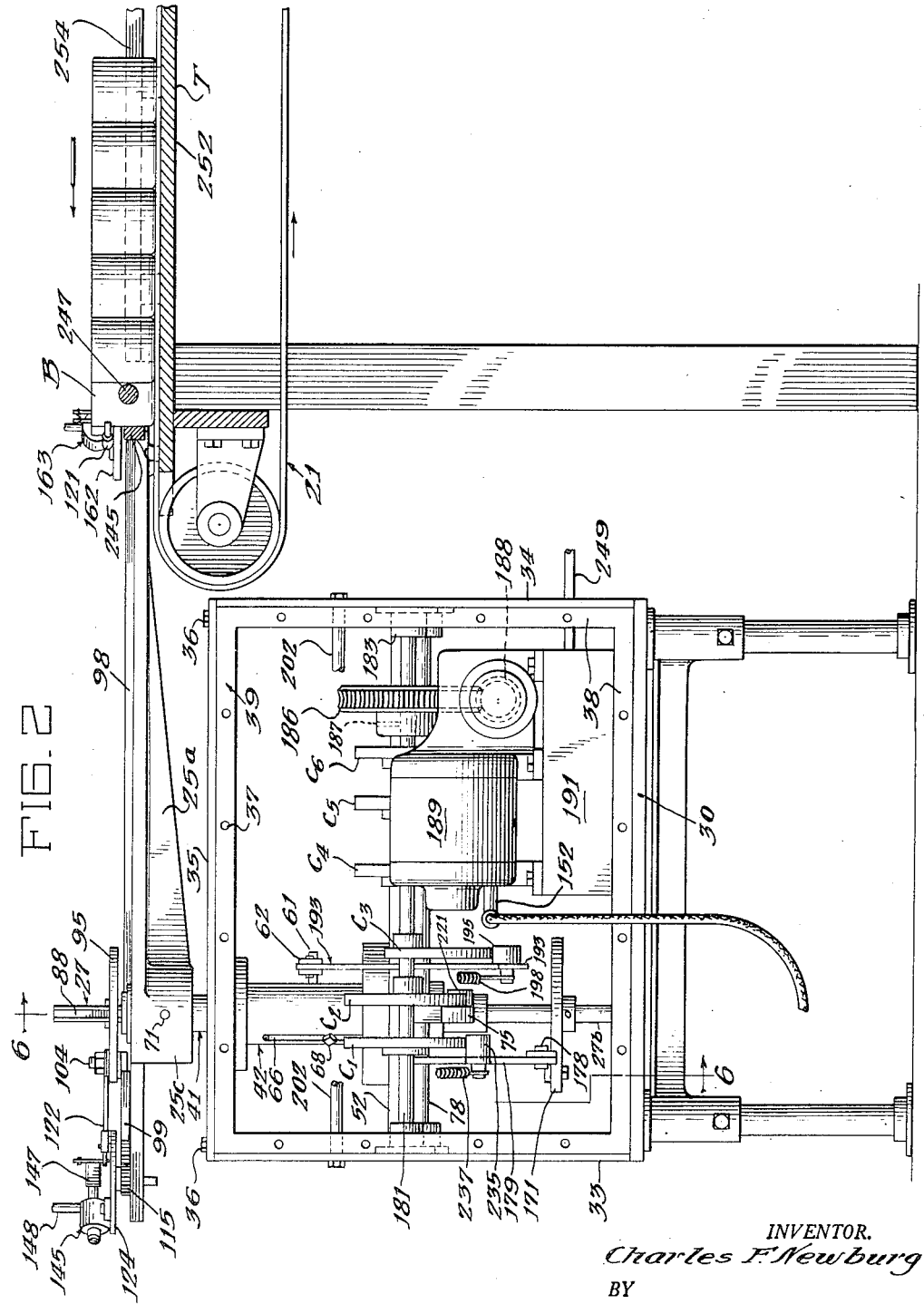
INVENTOR.
Charles F. Newburg
BY
Wallace and Cannon
Attorneys Oct. 26, 1954
C. F. NEWBURG
2,692,693
ARTICLE HANDLING APPARATUS
Filed April 13, 1950
10 Sheets-Sheet 3
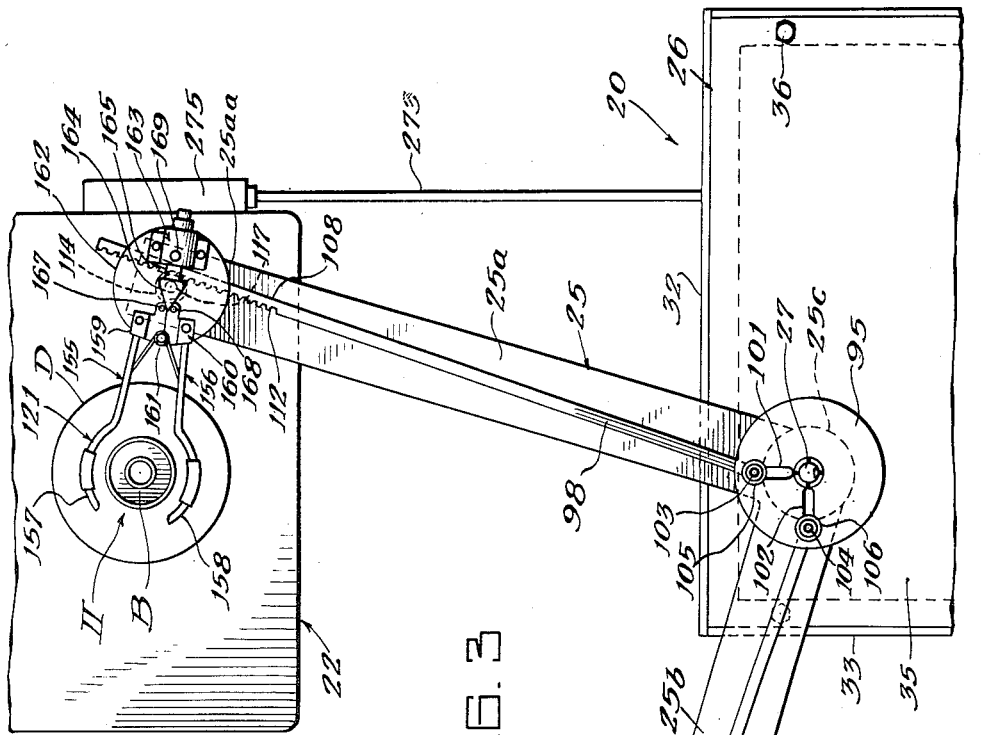
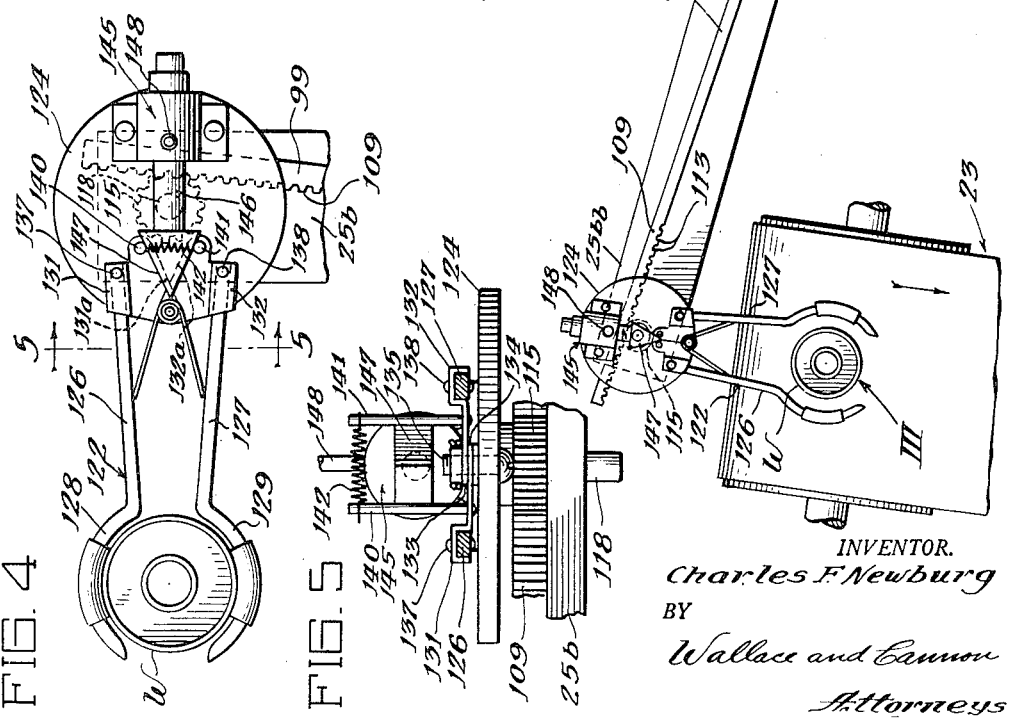
INVENTOR.
Charles F. Newburg
BY
Wallace and Cannon
Attorneys

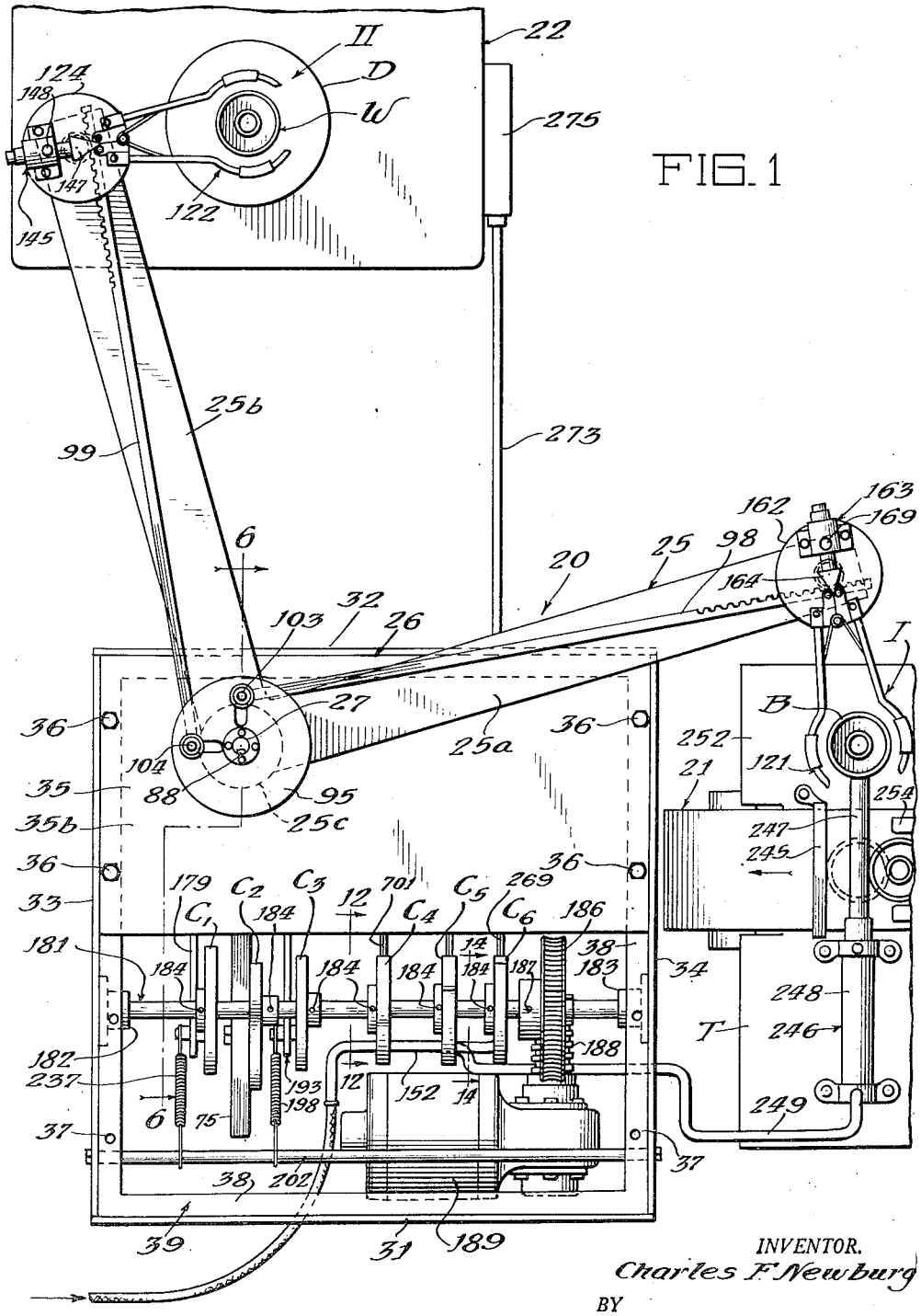

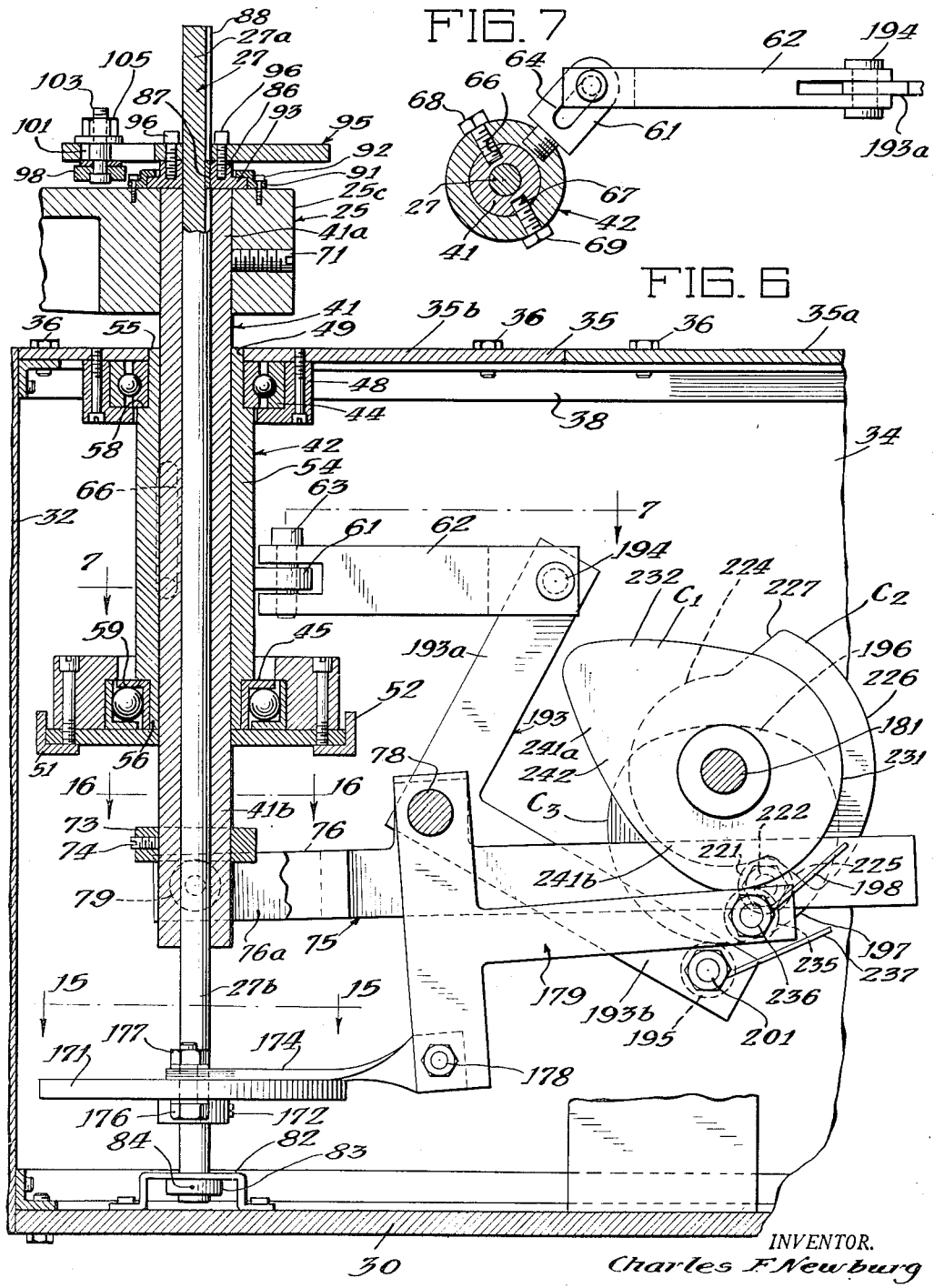

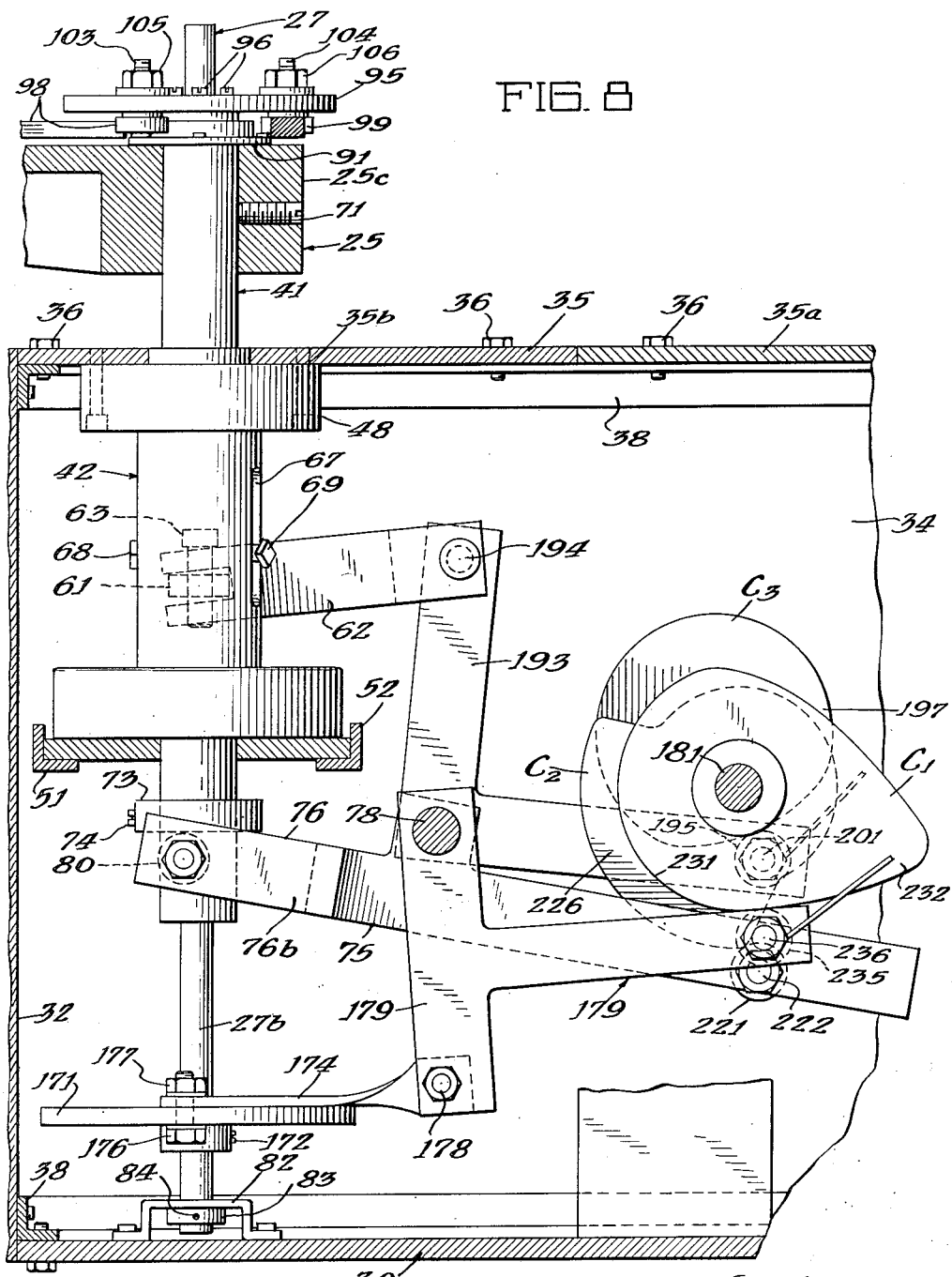

INVENTOR.
Charles F. Newburg
By: Wallace and Cannon
Attorneys

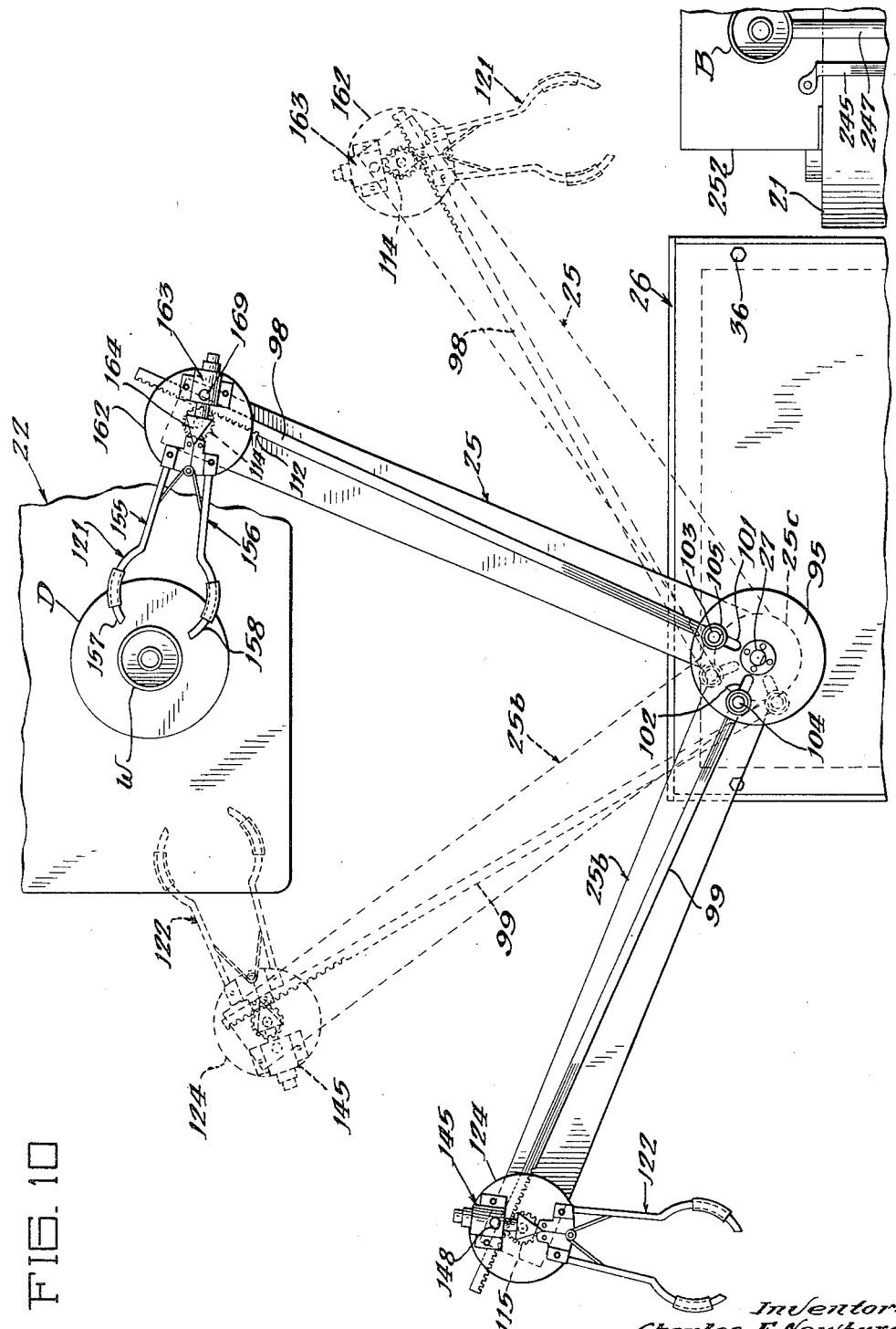

Oct. 26, 1954   C. F. NEWBURG   2,692,693
ARTICLE HANDLING APPARATUS
Filed April 13, 1950   10 Sheets-Sheet 8

INVENTOR.
Charles F. Newburg
BY
Wallace and Cannon
Attorneys

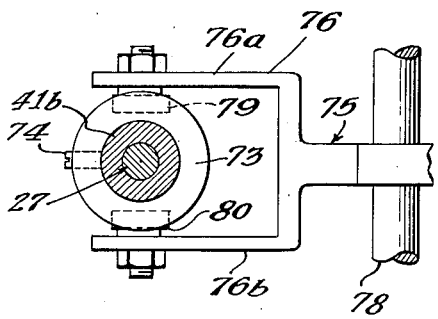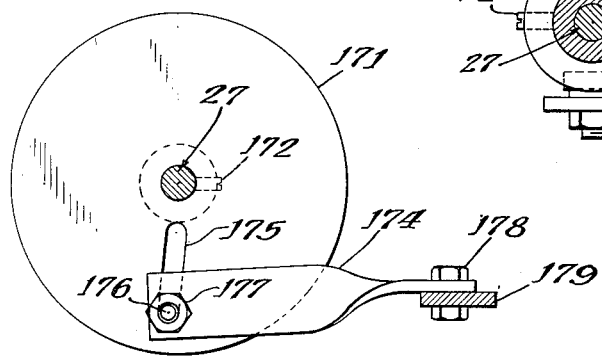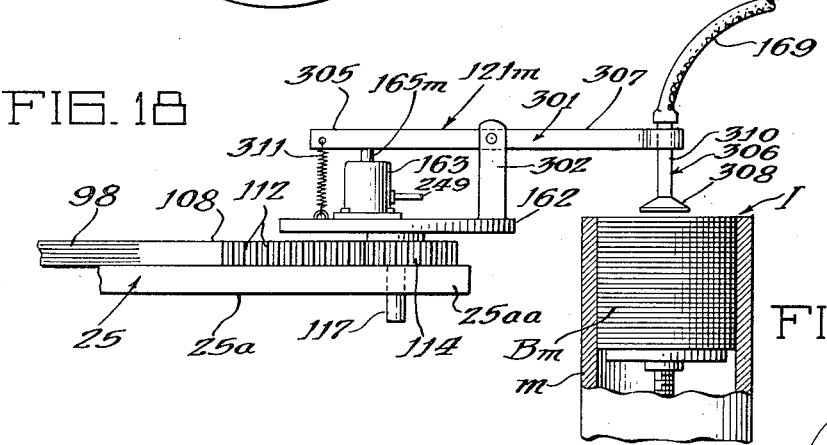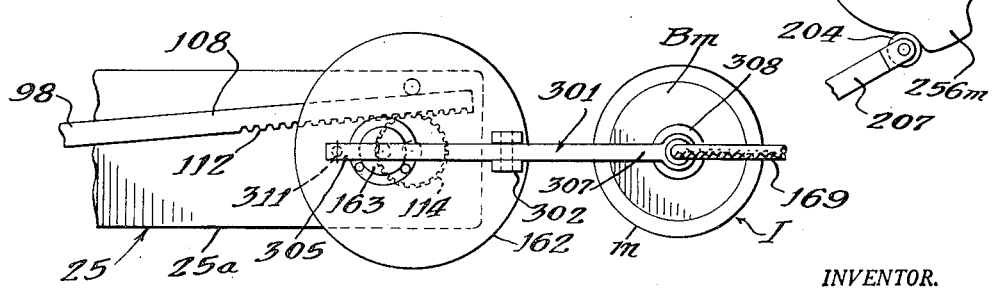

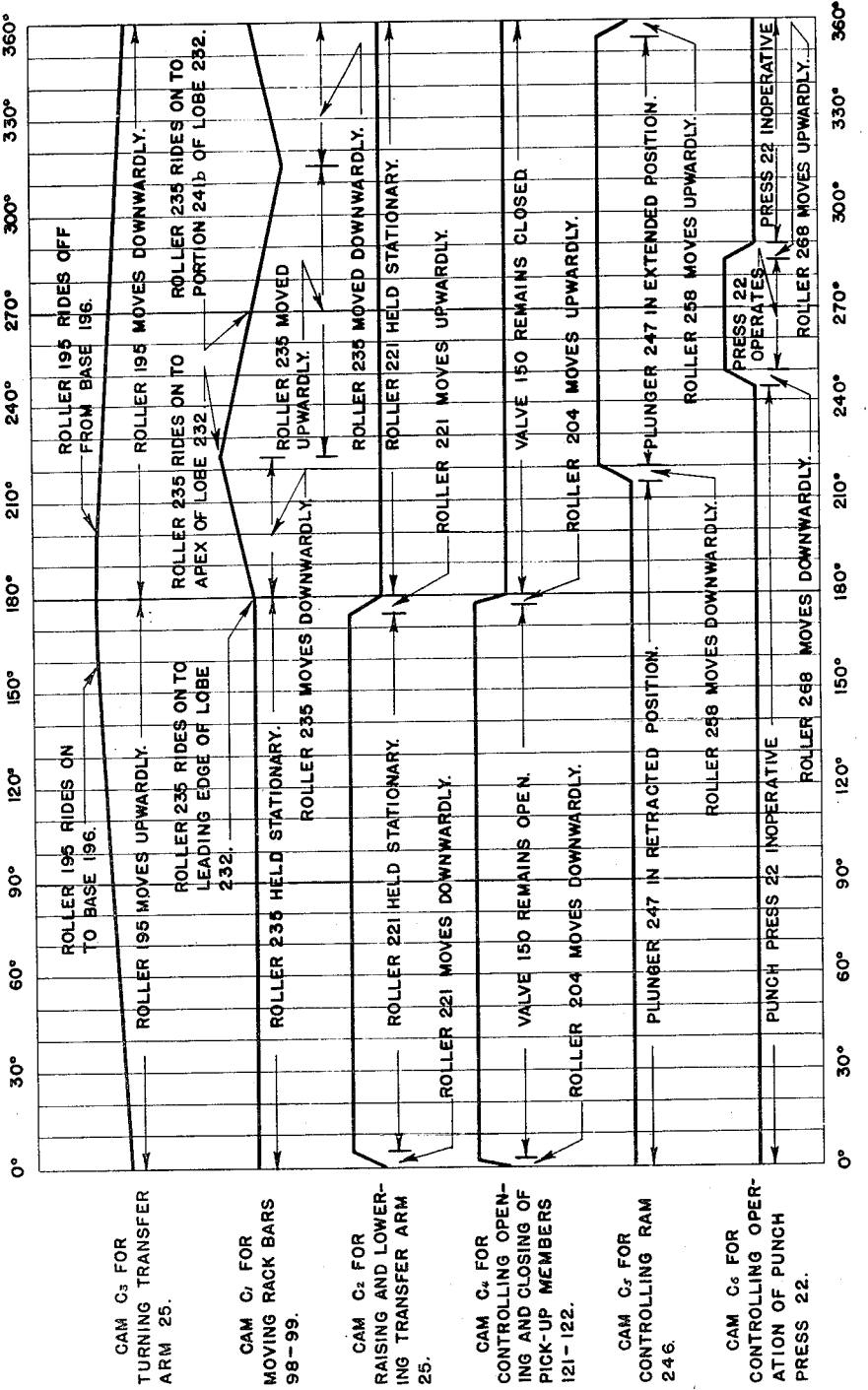

Patented Oct. 26, 1954

2,692,693

UNITED STATES PATENT OFFICE 2,692,693

ARTICLE HANDLING APPARATUS

Charles F. Newburg, Chicago, Ill.

Application April 13, 1950, Serial No. 155,705

11 Claims. (Cl. 214—151)

This invention relates to transfer devices and, more particularly, to transfer devices of the type especialy well adapted to move work pieces from one machine to another, or from one work station to another, in timed sequence with the operation of the machine, or machines, performing operations on the work pieces.

In the commercial production of many articles various forming, stamping, punching, grinding, polishing, and other operations are often required to be performed, and such operations are often performed in sequence in a single machine, or in a battery of different machines with the work pieces moved from station to station for the various operations. It is a primary object of my invention to enable such work pieces to be transferred into and out of such work stations, and the like, in a novel and expeditious manner.

A further object of my invention is to provide a novel transfer device which is so constituted and arranged that it affords an auxiliary unit which may be used with different types of machines for the purpose of transferring work pieces into and out of work stations in the machine in conjunction with which it is used, and which, if so desired, may be used to control the operation of the associated machine.

Many of the commercial production operations performed on work pieces at the present time are performed by machines wherein the work pieces are fed into the machine and removed from the machine by hand with considerable danger to the operator of the machine who must manually feed the work pieces into and out of the machine. For example, in the operation of punch presses, and the like, it is common procedure for the operator of the punch press to manually feed blanks or work pieces into the machine and, after the completion of the punching operation thereon, to remove the work piece from the machine. As is evidenced by the constantly occurring mishaps wherein fingers, hands, and the like, of operators are smashed, mangled, or cut off, such manual feeding of punch presses, and like machines, is, to say the least, inherently dangerous.

Another object of my invention is to eliminate the necessity for the manual feeding of, and removal of, work pieces into and out of various machines such as, for example, punch presses, and the like, by enabling such work pieces to be fed into and out of operative position in the machines in a novel and expeditious manner.

Various types of transfer devices have heretofore been known in the art, but such transfer devices have had several inherent disadvantages such as, for example, being large and cumbersome; being complicated in construction and operation; being expensive to manufacture; being suited only for operation with, or as a part of, a particular machine; being unreliable and inefficient in operation, and the like. A further important object of my invention is to overcome these, and other disadvantages of transfer devices heretofore known in the art and to afford a novel, compact transfer device, which may be economically manufactured commercially, may be used as a transfer device in conjunction with various machines, and types of machines, and which is reliable and efficient in operation.

Yet another object of my invention is to provide a novel transfer device of the aforementioned type wherein, during an operation of the device, gripping members for holding work pieces and the like during the transfer of the work pieces reciprocate in a novel and expeditious manner between work stations, to and from which work pieces are transferred.

A further object is to provide a novel transfer device of the aforementioned type operable in a novel manner to feed work pieces from one work station to a second work station and simultaneously feed work pieces from the aforementioned second work station to a third work station.

Another object of my invention is to provide a unitary transfer device of the aforementioned type which comprises a complete unit which may be readily assembled in operative position relative to the machines or other devices with which it is to be used, and which, when so assembled, affords an efficient, practical device for transferring work pieces into and out of operative position relative to the aforementioned other machines or devices.

Yet another object is to provide a novel transfer device of the aforementioned type wherein the movement and operation of the various working parts thereof are effected, and may be controlled, in a novel and expeditious manner.

A further object is to provide a novel transfer device of the aforementioned type wherein the various parts thereof may be readily adjusted in a novel and expeditious manner.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a top plan view of a transferring device embodying the principles of my invention, the portion of the top cover thereof being removed to expose certain underlying mechanism;

Fig. 2 is a side elevational view of the device shown in Fig. 1, with certain parts removed;

Fig. 3 is a fragmentary top plan view of the device shown in Fig. 1, showing certain parts thereof in a different operative position;

Fig. 4 is an enlarged detail view of a portion of the mechanism shown in Fig. 3;

Fig. 5 is a detail sectional view taken substantially on the line 5—5 in Fig. 4;

Fig. 6 is a detail sectional view taken substantially on the line 6—6 in Fig. 1;

Fig. 7 is a detail sectional view taken substantially on the line 7—7 in Fig. 6;

Fig. 8 is a detail sectional view similar to Fig. 6, but showing the parts therein in a still different operative position;

Fig. 10 is a fragmentary top plan view similar to Fig. 3, but showing certain parts thereof in different operative position;

Fig. 15 is a detail sectional view taken substantially on the line 15—15 in Fig. 6;

Fig. 16 is a detail sectional view taken substantially on the line 16—16 in Fig. 6;

Fig. 17 is a timing chart showing the time of operation of various elements during an article-transferring cycle of operation;

Fig. 18 is a detail side elevational view showing a modified form of a pick up member;

Fig. 19 is a detail top plan view of the mechanism shown in Fig. 18; and

Fig. 20 is a detail sectional view similar to Fig. 12 but showing a cam embodied in the modified form of my invention.

Figure 11:
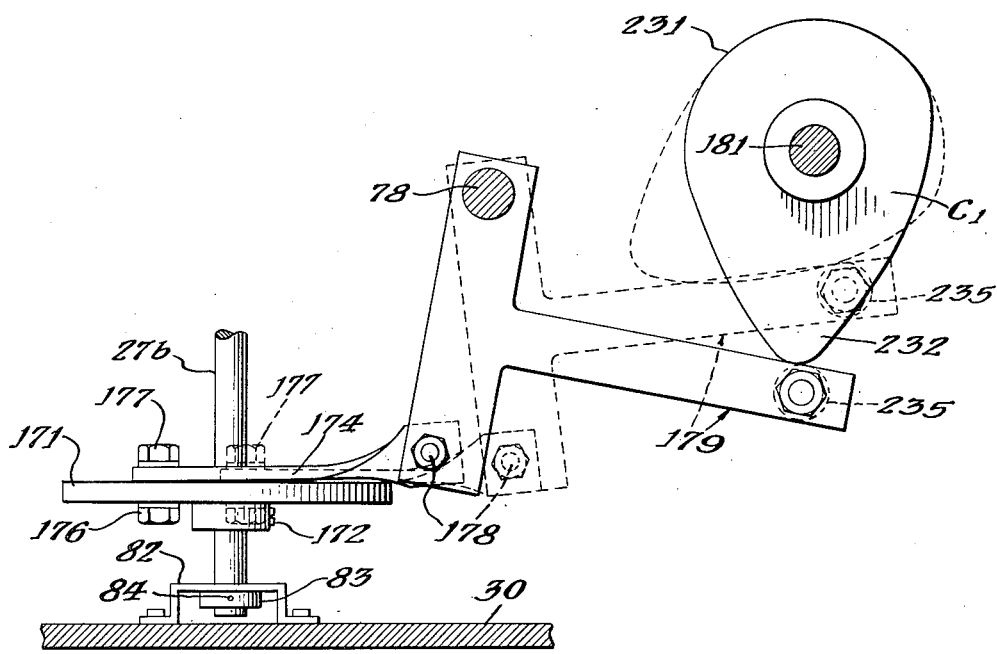
Fig. 11 is a detail sectional view of a portion of the mechanism shown in Fig. 6, but showing the mechanism in a different operative position.
Figure 9:
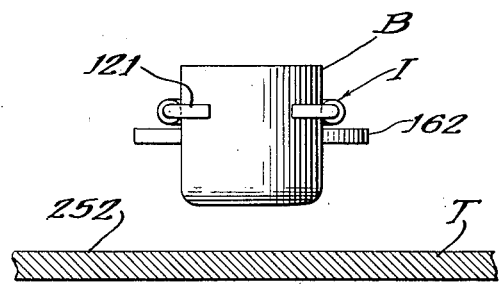
Fig. 9 is a detail end elevational view of a pick up member embodied in my device showing the pick up member in the process of moving a work piece.

For the purpose of disclosing the principles of my invention, a material handling device or transferring device 20, comprising a preferred embodiment of my invention, is shown in Figs. 1 to 17, inclusive, of the drawings, operatively associated with a supply conveyor belt 21, Fig. 1, a punch press 22, Figs. 1 and 3, and a discharge conveyor belt 23, Fig. 3.

In general, my novel transfer device 20 comprises a substantially L-shaped transfer arm 25 pivotally mounted in substantially horizontal position on top of a housing 26, the transfer arm being operable to swing, or pivot, upon a shaft 27 back and forth between the positions shown in Figs. 1 and 3, to thereby transfer blanks B from a work station I, adjacent the supply conveyor belt 21, onto a work station II, which, in this instance, comprises the die D of the punch press 22, wherein a punch press operation is performed on the blanks B to produce a finished work piece W, and, thereafter, move the finished work piece W from work station II to work station III, which latter work station comprises the discharge conveyor belt 23, this latter transfer, namely, the transfer of the work piece W from station II to station III taking place while the next blank B is being moved from station I to station II.

It will be understood, of course, that the supply conveyor belt 21, and the discharge conveyor belt 23 are shown merely to illustrate suitable means for feeding blanks B to my device 20, and for feeding finished work pieces W away from the device 20, and that other types of feeding and discharging devices may be substituted therefor without departing from the purview of my invention.

Likewise, it will be appreciated that the punch press 22 is shown in conjunction with my novel material handling device 20 merely for the purpose of illustrating a typical type of machine with which my novel material handling device may be efficiently used and that machines other than the punch press 22 such as, for example, arbor presses, shell loading machines, assembly machines, and the like, may be used with my novel material handling device without departing from the purview of my invention.

The housing 26, Figs. 1, 3 and 6, comprises a bottom wall 30, a front wall 31, a rear wall 32, two side walls 33 and 34, and a top wall 35, connected together by bolts 36 which extend through the peripheral edge portions of the walls 30—35 and are engaged in tapped openings 37 in angle brackets 38 forming a frame 39, whereby each of the walls 30—35 are readily removable from the housing 26 by removing the bolts 36, securing that wall to the adjacent flange 38. The top wall 35 comprises separately removable front and rear sections 35a and 35b, respectively, Fig. 6.

The shaft 27, on which the L-shaped transfer arm 25 is mounted, is rotatable in a sleeve 41, Fig. 7, which, in turn, is slidably mounted in a sleeve 42 journaled in a ball bearing 44, and a thrust bearing 45 in the housing 26. The ball bearing 44 is held by a bracket 48 against the lower face of the rear section 35b of the top wall 35 in registration with an opening 49 extending therethrough. The thrust bearing 45 is mounted on rails 51 and 52, Fig. 6, extending between and mounted on the side walls 33 and 34 of the housing 26.

The sleeve 42 is substantially cylindrical in shape having an enlarged central body portion 54 and two reduced end portions 55 and 56 to thereby afford shoulders 58 and 59 disposed in abutting relation to the roller bearing 44 and the thrust bearing 45, respectively. The reduced end portion 55 of the sleeve 42 projects through the bearing 44 and the upper end portion thereof is substantially flush with the top surface of the rear section 35b of the top wall 35 on the housing 26. A lug 61, Figs. 2, 6 and 7, is mounted on and projects outwardly from the central body portion 54 of the sleeve 42 and is connected to one end of a link 62 by means of a bolt 63 which extends through, and is slidably mounted in a slot 64 formed in the lug 61, the link 62 affording a portion of actuating mechanism for periodically turning or oscillating the sleeve 42 for purposes which will be discussed in greater detail hereinafter.

The sleeve 41 is of substantially smooth cylindrical shape and is non-rotatable, but longitudinally slidably, mounted in the sleeve 42, the sleeve 42 having two longitudinally extending, diametrically opposed slots or openings 66 and 67, Figs. 6 and 7 through which extend two bolts 68 and 69, respectively, which are mounted in the sleeve 41 and extend outwardly therefrom.

The upper end portion 41a of the sleeve 41 projects upwardly from the top wall 35 of the housing 26 and the apex 25c of the substantially L-shaped transfer arm 25, which comprises the junction between the legs 25a and 25b of the arm 25, is mounted on this upper end portion 41a of the sleeve 41, and non-rotatably secured with relation thereto by suitable means such as, a screw 71, Fig. 7, extending through the apex or hub portion 25c of the transfer arm 25 into abutting relation with the upper end portion 41a of the sleeve 41.

The lower end portion 41b of the sleeve 41 projects downwardly from the thrust bearing 45 and terminates in spaced relation to the bottom wall 30 of the housing 26. A collar 73 is mounted on the lower end portion 41b of the sleeve 41 and is secured thereto by suitable means such as a screw 74. An elongated lever 75, having a yoke 76 at one end thereof, Figs. 6 and 16, is pivotally mounted on a rod 78, Figs. 2 and 6, which extends between and is mounted on the side walls 33 and 34 of the housing 26. Two rollers 79 and 80 are rotatably mounted on the legs 76a and 76b, respectively, of the yoke 76 and project inwardly therefrom into supporting engagement with the peripheral edge portion of the bottom surface of the collar 73 mounted on the lower end portion 41b of the sleeve 41. Thus, it will be seen that upon rotation of the lever 75 on the rod 78, in a clockwise direction, as viewed in Fig. 6, from the position shown in Fig. 6, to the position shown in Fig. 8, the rollers 79 and 80 carried by the yoke 76 are effective to raise the collar 73 and thereby cause the sleeve 41 to be shifted upwardly in the sleeve 42 and raise the transfer arm 25 relative to the housing 26 for a purpose which will be discussed in greater detail presently. On the other hand, upon rotation of the lever 75 on the rod 78 in a counter-clockwise direction from the position shown in Fig. 8 to the position shown in Fig. 6, the weight of the transfer arm 25 and the sleeve 41 and the mechanism carried thereby is sufficient to cause the sleeve 41 to move downwardly with the yoke 76, maintaining the sleeve 73 in supported relation to the rollers 79 and 80.

As is best seen in Figs. 6 and 8, the upper end portion 27a and the lower end portion 27b of the shaft 27, project upwardly from and downwardly from, respectively, the sleeve 41. The lower end portion 27b of the shaft 27 projects downwardly through a substantially U-shaped bracket 82 mounted on the top face of the bottom wall 30 of the housing 26, and terminates in spaced relation to the top face of the bottom wall 30. A collar 83 is mounted on the lower end portion 27b of the shaft 27 below the bracket 82 and is secured to the shaft 27 by suitable means, such as a pin 84, to thereby restrain the shaft 27 from upward movement relative to the housing 26.

A collar 86 is mounted on the upper end portion 27a of the shaft 27, and is non-rotatably but slidably secured thereto by a key 87 and a keyway 88. The collar 86 is mounted on the top face of the hub 25c of the transfer arm 25 and is rotatably retained thereon by a ring 91 secured to the hub 25c by suitable means such as screws 92 and having a portion overlying a flange 93 on the lower end portion of the sleeve 86. A plate or disc 95 is mounted on the upper end portion 27a of the shaft 27 and is secured to the sleeve 86 by suitable means such as screws 96. Thus, it will be seen that the shaft 27 is rotatably mounted in the sleeve 41 for rotation independently of the transfer arm 25, and that the plate 95, connected to the shaft 27 by the collar 86, is rotatable with the shaft 27.

Two rack bars 98 and 99 are pivotally connected to the plate 95 by pin and slot connections, Figs. 3 and 6, the elongated slots 101 and 102 being formed in the plate 95 and extending substantially radially therein, and the pins, comprising bolts 103 and 104, extending through the respective slots 101 and 102. The rack bars 98 and 99 are rotatably mounted at one end on the lower end portion of the pins 103 and 104, respectively. Two nuts 105 and 106 are mounted on the bolts 103 and 104 whereby, by tightening the nuts 105 and 106 on the bolts 103 and 104, the bolts 103 and 104 may be firmly, but releasably, secured in adjusted position to thereby afford readily adjusted pivot points for the rack bars 98 and 99.

Two racks 108 and 109 having teeth 112 and 113, respectively, are formed on the other end portions of the rack bars 98 and 99 and are disposed in meshing engagement with gears 114 and 115 mounted on pins 117 and 118 journaled in the free end portions 25aa and 25bb of the legs 25a and 25b of the transfer arm 25.

Two pick up members 121 and 122 are mounted on the pins 117 and 118, respectively, Figs. 1, 3, 4 and 5, for rotation therewith relative to the free end portions 25aa and 25bb of the transfer arm 25, upon movement of the rack bars 98 and 99 relative to the legs 25a and 25b of the transfer arm 25, as will be discussed in greater detail hereinafter.

The pick up member 122 includes a plate 124 mounted on the upper end portion of the pin 118 in spaced relation to the free end portion 25bb of the leg 25b of the transfer arm 25, to thereby afford clearance for the rack 109, Fig. 5. Two elongated grippings members 126 and 127 having substantially arcuate shaped free end portions 128 and 129 affording clamping jaws or gripping fingers for grippingly engaging therebetween articles of work and the like, are pivotally mounted on a bolt 135 on the peripheral edge portion of the top surface of the plate 124. The pivotal connection of the gripping members 126 and 127 to the plate 124 is effected through bracket plates 131 and 132 mounted on the other end portions of the gripping members 126 and 127 opposite to the free end portions 128 and 129, Fig. 4, and having ears 133 and 134, respectively, pivotally mounted on the bolt 135 which extends through the plate 124, the bracket plates 131 and 132 being attached to the gripping members 126 and 127 by suitable means such as, rivets 137 and 138, respectively. Two pins 140 and 141, Figs. 4 and 5, project upwardly from the rear end portions of the bracket plates 131 and 132 and are interconnected by a tension coil spring 142 which tends to pull the pins 140 and 141 and, therefore, the rear end portions of the bracket plates 131 and 132 toward each other into such position that the adjacent edge portions 131a and 132a of the bracket plates 131 and 132 are disposed in closed or abutting relation to each other and the gripping fingers 128 and 129 on the other end portion of the gripping members 126 and 127 are disposed in open or relatively widely spaced relation to each other.

An air cylinder 145 having a plunger 146, is mounted on the upper face of the plate 124 and carries a wedge shaped head 147 mounted on the free end portion of the plunger 146 which head 147 is normally disposed adjacent to, but out of engagement with, the rear end portions of the bracket plates 131 and 132. With the head 147 of the plunger 146 on the air cylinder 145 disposed in this position, it will be seen that the spring 142 is effective to hold the gripping fingers 128 and 129 of the gripping members 126 and 127 in the open position shown in Fig. 3.

Figures 12, 14:
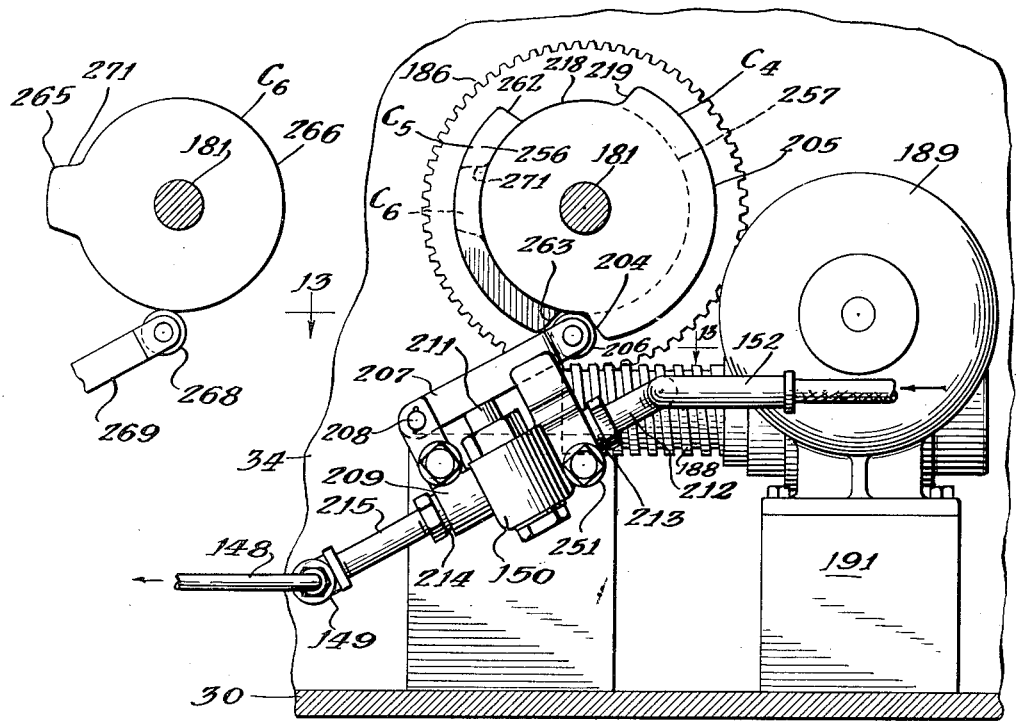
Fig. 12 is a detail sectional view taken substantially on the line 12—12 in Fig. 1.
Fig. 14 is a detail sectional view taken substantially on the line 14—14 in Fig. 1.

An air line 148 is connected at one end to the air cylinder 145 and is connected at the other end through a T-connection 149 and a control valve 150 to a source of supply of compressed air such as a conduit 152, Fig. 12, for controllably feeding and exhausting, compressed air into, and out of, the cylinder 145 to thereby reciprocate the plunger 146 and move the wedge shaped head 147 into, and out of, wedging engagement with the adjacent edges 131a and 132a of the bracket plates 131 and 132 to thereby cause the finger members 126 and 127 to pivot on the bolt 135 between the closed position shown in Fig. 4 and the open position shown in Fig. 3. Such actuation of the valve 150 and, therefore, of the air cylinder 145 is controlled in timed relation to the actuation of other units in my novel transfer device 20, as will be discussed in greater detail presently.

The pickup member 121 is substantially the same as the pick up member 122, and comprises two elongated gripping members 155 and 156 having arcuate shaped free end portions or gripping fingers 157 and 158 on one end thereof, and having the other ends thereof pivotally mounted by bracket plates 159 and 160 and a pin 161 to the peripheral edge portion of a plate 162 mounted on the upper end portion of the pin 114. An air cylinder 163 having a wedge shaped head 164 on the free end portion of the plunger 165 thereof is mounted on the top face of the plate 162 in position wherein upon actuation of the air cylinder 163 and the resultant reciprocation of the head 164, the fingers 157 and 158 of the gripping members 155 and 156 are caused to open and close in the same manner heretofore discussed with relation to the fingers 128 and 129 of the pick up member 122, a suitable spring such as the spring 142, being mounted between the pins 167 and 168 projecting upwardly from the rear end portions of the bracket plates 159 and 160.

The air cylinder 163 is connected by an air line 169 to the other side of the T connection 149 to thereby connect the air cylinder 163 through the control valve 150 to the conduit 152 for controlling the feeding of air from the conduit 152 to the air cylinder 163 as will be discussed in greater detail hereinafter.

It will be remembered that the transfer arm 25 is mounted on the upper end portion of the sleeve 41 and that, as hereinbefore discussed in general, during an operation of my novel transver device 20, the transfer arm 25 is caused to oscillate between the position shown in Fig. 1 to the position shown in Fig. 3. The purpose, of course, of this oscillation of the arm 25 is to move blanks B from the supply conveyor belt 21 onto the die D of the punch press 22 and to move finished work products W from the die D of the punch press 22 onto the discharge conveyor belt 23. To accomplish this operation, the pick up members 121 and 122 are actuated during the oscillation of the transfer arm 25 to grip blanks B and work pieces W at station I and station II, and discharge the thus grasped blank B and work piece W onto the die D and the discharge conveyor belt 23, at stations II and III, respectively. During such oscillation of the transfer arm 25, it will be seen that the leg 25a thereof, oscillates between station I and station II in such a manner that the free end portion thereof stops short of each station at each extreme end of the oscillation of the leg 25a and does not pass over either station I or station II. Similarly, it will be seen that during such oscillation of the transfer arm 25, the free end portion 25bb of the leg 25b oscillates between stations II and III in such a manner that it stops short of each station at each extreme end of the oscillation, and does not pass over either station II or station III.

During such oscillation of the transfer arm 25, as will be discussed in greater detail presently, the rack bars 98 and 99 perform two functions, namely, (1) to pivot the pick up members 121 and 122 on the legs 25a and 25b of the transfer arm 25 from the position wherein they project to the right of the legs 25a and 25b as viewed in Fig. 1, when the transfer arm 25 is disposed in the position shown in Fig. 1, to the position wherein they project to the left from legs 25a and 25b, as viewed in Fig. 3, when the transfer arm 25 is disposed in the position shown in Fig. 3; and, (2) to control the movement of the gripping members 121 and 122 in such a manner that during the final stages of the movement of the free end portions 25aa and 25bb of the legs 25a and 25b toward stations I and II, respectively, into the position shown in Fig. 1, and during the initial movement of the gripping members 121 and 122 away from stations II and III, respectively, or, in other words, away from the position shown in Fig. 3, the gripping fingers 157 and 158, and 128 and 129, of the pick up members 121 and 122, respectively, move substantially in a straight line. It will be seen that, with the free end portions of the gripping members 121 and 122 thus moving into position over stations I and II, respectively, and, also, thus moving in a relatively straight line out of position over stations II and III, respectively, the movement of the members 121 and 122 is such as to substantially eliminate the danger of accidentally striking the articles discharged or to be picked up, or other articles adjacent thereto, and enables the transfer device 20 to operate with accuracy both in picking up and discharging articles handled thereby.

Such control of the pick up members 121 and 122 is effected by controlling the rotation of the pick up members 121 and 121a relative to the free end portions 25aa and 25bb of the legs 25a and 25b, respectively, as will be discussed in greater detail hereinafter. Such rotation of the gripping members 121 and 122 is effected by rotating the pins 117 and 118 and this, in turn, is effected by rotating the gears 114 and 115 by movement of the rack bars 98 and 99 relative to the legs 25a and 25b of the transfer arm 25. Such movement of the rack bars 98 and 99 and the legs 25a and 25b relative to each other is effected by rotating the plate 95 relative to the hub 25c of the transfer arm 25 and this is accomplished by rotating the shaft 27 within the sleeve 41.

For the purpose of rotating the shaft 27, I provide a plate 171 mounted on the lower end portion 27b of the shaft 27 and secured thereto by suitable means such as a screw or pin 172, Figs. 6, 11 and 15. One end of a link 174 is connected by a pin and slot connection to the plate 171, the slot 175 being formed in the plate 171 and a pin comprising a bolt 176 extending through the slot 175 and one end of the link 174, and having a nut 177 thereon for retaining the bolt 176 in the slot 175, the bolt 176 being freely slidably longitudinally of the slot 175. The other end portion of the link 174 is pivotally connected by a bolt 178 to one end of the cross bar of a substantially T-shaped lever 179, the other end portion of the cross bar of the lever 179 being pivotally mounted on the rod 78. It will be seen that rotation of the lever 179 in a clockwise direction as viewed in Fig. 6 will be effective to turn the plate 171 and therefore, the shaft 27 and the plate 95, in a clockwise direction as viewed in Fig. 3, to thereby move the rack bars 98 and 99 outwardly toward the free end portions 25aa and 25bb of the legs 25a and 25b of the transfer arm 25, respectively. On the other hand, it will be seen that rotation of the lever 179 in a counter-clockwise direction, as viewed in Fig. 6, will be effective to rotate the plate 171 and therefore, the shaft 27 and the plate 95 in a counter-clockwise direction, as viewed in Fig. 3 to thereby pull the rack bars 98 and 99 inwardly away from the free end portions 25aa and 25bb of the legs 25a and 25b of the transfer arm 25, respectively.

Thus, from the foregoing, it will be seen that by properly rotating the lever 179 on the rod 78, the plate 171, the shaft 27 and the plate 95, may be caused to oscillate to thereby oscillate the pins 103 and 104 between the positions shown in solid and broken lines in Fig. 10, and move the rack bars 98 and 99 inwardly and outwardly relative to the legs 25a and 25b of the transfer arm 25 to pivot the pick up members 121 and 122 relative to the legs 25a and 25b.

For the purpose of effecting and controlling the operation of the various parts of my novel transfer device 20, I embody a cam shaft 181, journaled in suitable bearings 182 and 183 mounted on the inner face of the side walls 33 and 34 of the housing 26. Six cams C1, C2, C3, C4, C5 and C6, are mounted on the cam shaft 181 and secured thereto for rotation therewith by suitable means such as pins 184, Fig. 1. A worm wheel 186 is mounted on the cam shaft 181 outwardly of the cam C6 and secured to the cam shaft 181 by suitable means, such as a pin 187. The worm wheel 186 is operatively engaged with and driven by a worm 188 operatively connected to a suitable power source, such as a motor 189 mounted on a base 191 in the housing 26 adjacent to the cam shaft 181. The motor 189, acting through the worm 188 and the worm wheel 186 is operable to rotate the cam shaft 181, and therefore, the cams C1-C6, in a clockwise direction, as viewed in Fig. 6.

A complete cycle of operation of my novel transfer device is accomplished during each complete revolution of the cam shaft 181, and, during such a rotation of the cam shaft 181, the cams C1-C6 are operable to cause the various elements of my novel transfer device 20 to pass through a complete cycle of operation, as will be discussed in greater detail presently.

It will be remembered that reciprocation of the link 62 to the left and right, as viewed in Fig. 6, is effective, through the pin 63 and the lug 61 on the sleeve 42, to oscillate the sleeve 42, and, therefore, the sleeve 41, and thereby oscillate the transfer arm 25 in a horizontal direction around the shaft 27. To effect such reciprocation of the link 62 one arm 193a of a bell crank lever 193, pivotally mounted on the rod 78, is pivotally connected by a pin 194 to the other end of the link 62 opposite that end to which the lug 61 is attached. A cam roller or cam follower 195 is rotatably mounted by a pin 201 on the free end of the other leg 193b of the bell crank lever 193 and is operatively engaged with the peripheral edge of the cam C3.

As is best seen in Figs. 6 and 8, the cam C3 is substantially of circular shape or outline, being mounted eccentrically on the cam shaft 181 and the base 196 of the cam C3 being flattened somewhat from the true circular shape. The cam C3 is shown in Fig. 6 in substantially the position which it assumes at the close of a cycle of operation and just prior to the commencing of a new cycle of operation, this position corresponding to the position of the mechanism as shown in Fig. 1, wherein, it will be seen, the pick up members 121 and 122 are disposed around a blank B and a work piece W, respectively, but have not as yet been closed into gripping engagement therewith. During the next relatively small portion of the rotation of the cam shaft 181, as will be discussed in greater detail hereinafter, the pick up fingers 157 and 158, and the pick up fingers 128 and 129, will be closed into gripping engagement with the blank B and the work piece W. In addition, the transfer arm will be raised upwardly from the housing 26 to thereby lift the blank B and the work piece W clamped in the gripping members 121 and 122, and the transfer arm 25 will commence its rotation in a counter-clockwise direction from the position shown in Fig. 1 toward the position shown in Fig. 3. Thus, it will be seen that upon continued rotation of the cam C3 from the position shown in Fig. 6, the cam follower 195 will next engage the central portion of the lobe 197 of the cam C3 and, during the next 180° of rotation of the cam C3 the roller 195 will ride upwardly on the periphery of the cam C3 toward the cam shaft 181, a coil spring 198, connected between the pin 201 on which the roller 195 is mounted and a rod 202 mounted in and extending between the side walls 33 and 34, Figs. 1 and 2, being effective to thus pivot the bell crank 193 in a counter-clockwise direction on the shaft 78, and thereby retain the contact between the roller 195 and the peripheral edge portion of the cam C3. During this first 180° of rotation of the cam C3 in a cycle of operation, it will be seen that the upward movement of the cam roller 195 causes the bell crank 193 to move the link 62 to the left, as viewed in Fig. 6 and thereby pivot the sleeve 42, the sleeve 41, and the transfer arm 25 in a counter-clockwise rotation from the position shown in Fig. 1. The link 62 and the bell crank 193, and the cam C3, are so constituted and arranged that during this 180° of rotation of the cam C3 from the position shown in Fig. 6, to the position shown in Fig. 8 wherein the roller 195 is disposed just adjacent to the central portion of the base 196 of the cam C3, the transfer arm 25 is rotated with the sleeves 41 and 42 around the shaft 27 from the position shown in Fig. 1, to the position shown in Fig. 3, to thereby swing the free end portion of the leg 25a from a position adjacent to station I to a position adjacent to station II, and to swing the free end portion of the leg 25b from a portion adjacent to station II to a position adjacent to station III.

The cam shaft 181 is preferably continuously driven by the motor 189, and therefore, it will be seen that after the cam C3 has rotated through the aforementioned first 180° of travel to the position wherein the roller 195 is disposed adjacent to the central portion of the base 196 of the cam C3, the second 180° of rotation of the cam shaft 181 which concludes the full rotation of the cam C3 is effective to so move the cam C3 that the roller 195 is again positioned adjacent to the central portion of the lobe 197 of the cam C3, as shown in Fig. 6. During this second 180° of rotation of the cam C3, it will be seen that the roller 195 is pressed downwardly by the peripheral edge portion of the cam C3 to thereby pivot the bell crank 193 in a clockwise direction on the shaft 78 and move the link 62 to the right as viewed in Fig. 6. Such movement of the link 62, is effective through the lug 61 and the pin 63 to rotate the sleeve 42 and the sleeve 41, and therefore, the transfer arm 25 in a clockwise direction, as viewed in Fig. 3 to thereby pivot the transfer arm 25 horizontally around the shaft 27 from the position shown in Fig. 3, to the position shown in Fig. 1, to again reposition the free end portions of the legs 25a and 25b adjacent to station I and station II, respectively. This, it will be seen, comprises a complete cycle of operation of the swinging movement of the transfer arm 25.

Figure 13:
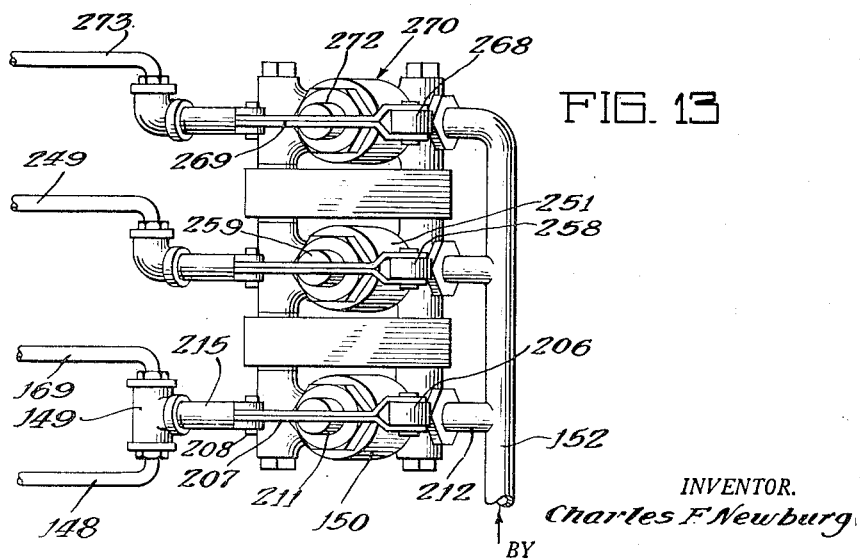
Fig. 13 is a detail view taken substantially on the line 13—13 in Fig. 12.

As is best seen in Fig. 12, when the cam C3 is disposed in the position shown in Fig. 1, wherein the roller 195 is disposed in engagement with that portion of the cam C3 corresponding to the close of a cycle of operation of my novel transfer device 20, the cam C4, which, as will be discussed in greater detail presently, controls the opening and closing of the gripping members 121 and 122 by controlling the opening and closing of the valve 150, Figs. 12 and 13, is so disposed that the leading edge 204 of the lobe 205 of the cam C4 is disposed adjacent to a cam roller 206 mounted on the free end portion of a lever 207 pivotally mounted at the other end thereof by a pin 208 to the body portion 209 of the valve 150. The central portion of the lever 207 between the pin 208 and the roller 206 is disposed in operative engagement with the control button or plunger 211 of the valve 150, the button 211 being so disposed in the valve 150 that upon depression of the button 211 into the body member 209 of the valve 150, the valve 150 is opened to thereby permit air to flow from the conduit 152, connected by suitable coupling members 212 to the inlet 213 of the valve 150, through the body portion 209 and outwardly through the outlet 214 of the valve 150 and coupling members 215 into the T connection 149 from whence the compressed air may flow through the hoses 148 and 169 into the air cylinders 145 and 165 to thereby actuate the wedges 147 and 164 and close the gripping members 121 and 122, as previously discussed. The button 211 is preferably of the spring urged type wherein upon outward movement of the button 211 from the aforementioned depressed position in the body member 209 of the valve 150, the passageway between the inlet 213 and the outlet 214 of the valve 150 is closed and an exhaust opening, not shown, is opened to permit air to flow back from the air cylinders 145 and 163 through the hoses 148 and 169 and the body portion 209 of the valve 150 to the atmosphere, to thereby permit the plunger 146 and 165 of the air cylinders 145 and 163 to be retracted by suitable means such as, springs, not shown. The valve 150 and the air cylinders 145 and 163 may be any one of several suitable types readily available on the market and, except as they constitute a part of my novel combination, do not constitute a part of my invention, no claim being made to any invention in the valve 150 and the air cylinders 145 and 163, per se.

The lobe 205 of the cam C4 is of such size and shape, and the cam C4 is so disposed on the shaft 181 that at the initiation of a cycle of operation the roller 206 is disposed on the dwell 218 of the cam C4, and, during the first 180° of rotation of the cam shaft 181, constituting the first half of a cycle of operation of my novel transfer device 20, the roller 206 rides up onto the lobe 205 of the cam C4 and again rides down off from the lobe 205 of the cam C4 onto the dwell 218. The leading edge 204 and the trailing edge 219 of the lobe 205 are, as is best seen in Fig. 12, somewhat abrupt so that the roller 206 rides onto the peripheral edge portion of the lobe 205 relatively quickly at the start of a cycle of operation, and rides off from the peripheral edge portion of the lobe 205 onto the dwell 218 relatively quickly at the end of the first 180° of rotation of the cam C4, the leading edge 204 and the trailing edge 219 being preferably so shaped that this movement of the roller 206 onto and off from the lobe 205 takes place within substantially 2° or 3° of rotation at the first and last part, respectively, of the first 180° of rotation of the cam C4.

When the roller 206 is disposed on the lobe 205 of the cam C4 the button 211 of the valve 150 is depressed by the lever 207 to thereby open the valve 150 and feed compressed air from the conduit 152 into the air cylinders 145 and 163 to thereby close the pick up members 121 and 122, as previously discussed. When the roller 206 is disposed on the dwell 218 of the cam C4, the button 211 of the valve 150 is in outwardly disposed position to thereby close the passageway between the conduit 152 and the outlet 214 of the valve 150, and the air cylinders 145 and 163 are opened to the atmosphere to thereby permit the air to be exhausted therefrom and permit the wedges 147 and 164 to be withdrawn from engagement with the bracket plates 131 and 132, and 159 and 160, respectively, and thereby permit the pick up members 121 and 122 to be opened by the springs 142. Thus, it will be seen that after substantially 2° or 3° of travel of the cam shaft 181, at the initiation of a cycle of operation, the pick up members 121 and 122, are closed and are held in such closed position until the cam shaft 181 has completed substantially 177° or 178° of a complete rotation, at which time the pick up members 121 and 122 are opened, and remain open during the remainder of a cycle of operation.

As is best seen in Fig. 6, when the cam C3 is disposed in the initial position shown in Fig. 6, a cam roller 221, rotatably mounted on a pin 222 on the end portion of the lever 75 opposite to the end on which the yoke 76 is mounted, is disposed in engagement with the peripheral edge portion of the dwell 224 on the cam C2, adjacent to the leading edge 225 of the lobe 226 of the cam C2. The leading edge 225 of the cam C2 is so formed that during the initial movement of the cam C2 in a cycle of operation, and preferably within substantially the first 5° of rotation, the roller 221 rides up the leading edge 225 of the cam C2 onto the peripheral edge portion of the lobe 226, thereof. A sloping trailing edge 227 is disposed at the other end portion of the lobe 226, and the lobe 226 and the trailing edge 227 are so constituted and arranged that, during the last 5° of the first 180° of rotation of the cam C2 in a cycle of operation, the roller 221 rides inwardly from the lobe 226 along the trailing edge 227 onto the dwell 224. Thus, it will be seen that the lobe 226 of the cam C2 is effective to press the roller 211 downwardly and to hold the roller 211 in such downwardly disposed position substantially throughout the first 180° of rotation, and then permit the roller 211 to move upwardly again into engagement with the dwell 224, with which it remains in engagement during the remainder of the cycle of operation.

It will be remembered that the lever 75 on which the roller 221 is mounted is pivotally mounted on the shaft 78 and is operatively connected by the roller 79 and 80 to the collar 73 on the lower end portion 41b of the sleeve 41, so that, upon rotation of the lever 75 in a clockwise direction, as viewed in Fig. 6, and as effected by downward movement of the roller 221 from the position shown in Fig. 6, the sleeve 41 and therefore, the transfer arm 25 and associated mechanism carried thereby is moved upwardly from the position shown in Fig. 6 toward the position shown in Fig. 8. Also, it will be seen that upon movement of the roller 211 upwardly from the lobe 226 back onto the dwell 224, the weight of the sleeve 41, the transfer arm 25 and associated mechanism, cause the lever 75 to pivot in a counter-clockwise direction on the shaft 78 to thereby lower the transfer arm 25 from the position shown in Fig. 8 to that shown in Fig. 6.

From the foregoing consideration of the operation of cams C3, C4, and C2, it will be seen that during the first 180° of rotation of the cam shaft 181 in a cycle of operation, the bell crank lever 193 is permitted to turn in a counter-clockwise direction, as viewed in Fig. 6, to thereby turn the transfer arm 25 in a counter-clockwise direction from the position shown in Fig. 1 to the position shown in Fig. 3, the shape of the cam C3 being such that during approximately the first 160° of rotation, the bell crank lever 193 and therefore, the transfer arm 25, is rotated at a substantially steady, relatively rapid rate and that during the last 20° of the first 180° of rotation, during which time the roller 201 is in engagement with the base 196 of the cam C3, the rate of rotation of the bell crank 193 and therefore, the transfer arm 25, is reduced. Thereafter, during the second 180° of rotation of the cam C3, the bell crank lever 193 is caused to turn in a clockwise direction as viewed in Fig. 6 to thereby turn the transfer arm 25 in a clockwise direction from the position shown in Fig. 3 to the position shown in Fig. 1, the first 20° of this second 180° of rotation, during which the roller 195 is engaged with the base 196 of the cam C3, the transfer arm being rotated at a relatively slow rate, and, during the last 160° of the second 180° of rotation of the cam C3, during which time the roller 195 is engaged with the lobe 197 of the cam C3, the bell crank lever 193 and the transfer arm 25 being moved at a substantially steady, relatively rapid rate.

Also, it will be seen that during the first 2° or 3° of rotation of the cam shaft 181 after the initiation of a cycle of operation, the valve 150 is actuated by the lobe 205 on the cam C4 to close the gripping members 121 and 122 on a blank B and a work piece W, respectively, mounted at stations I and II, respectively, whereby, upon rotation of the transfer arm 25 in a counter-clockwise direction by the cam C3, as previously discussed, the blank B is moved toward station II and the work piece W engaged by the pick up members 122 is moved toward station III. Also it will be seen that at the completion of the first 180° of rotation of the cam C3, and, therefore, of the transfer arm 25, the cam C4 is effective to actuate the valve 150 to open the gripping members 121 and 122 to thereby release the blank B and the work piece W held thereby, respectively. Thereafter, during the return movement of the transfer arm from the position shown in Fig. 3, to the position shown in Fig. 1, the roller 206 is disposed on the dwell 218 of the cam C4, and therefore, the gripping members 121 and 122 remain in open position.

Furthermore, it will be seen that during the first 5° of a rotation of the cam shaft 181, which is substantially twice the rotation required to actuate the valve 150, the cam C2 causes the transfer arm 25 to be raised to thereby lift the articles B and W grippingly engaged by the pick up members 121 and 122 from stations I and II, respectively. Thereafter, during the next 170° of rotation of the cam shaft 181, the cam C2 holds the transfer arm 25 in this raised position and then, during the last 5° of the first 180° of rotation of the cam shaft 181, at which time the arms 25a and 25b are nearing the positions adjacent stations II and III, respectively, as shown in Fig. 3, the cam C2 permits the transfer arm 25 to be lowered to thereby lower the thus transported blank B and work piece W toward stations II and III, respectively.

As previously mentioned, during operative movement of the transfer arm 25 on the shaft 27 in a cycle of operation of my novel transfer device 20, the leg 25a and the leg 25b oscillate between stations I and II, and stations II and III, respectively, without passing over any of the stations I–III. To effect transfer of the blank B from work station I to work station II, and to effect transfer of a finished work piece W from work station II to work station III, during such movement of the arm 25, the pick up members 121 and 122, respectively, are moved from the position shown in Fig. 1, wherein they project to the right from the legs 25a and 25b, respectively, to the position shown in Fig. 3, wherein they project to the left from the legs 25a and 25b. To effect this movement of the gripping members 121 and 122, the rack bars 98 and 99 are afforded. The rack bars 98 and 99 swing with the legs 25a and 25b, but it will be seen that, in so doing, the rack bars swing about different pivot points than the pivot point around which the transfer arm 25 swings, so that the rack bars 98 and 99, are, in effect, moved longitudinally inwardly and outwardly relative to the free end portions 25aa and 25bb of the legs 25a and 25b and are thereby effective, through the resultant movement of the racks 108 and 109 relative to the pinion gears 114 and 115, to thereby swing the pick up members 121 and 122 around the free ends of the legs 25a and 25b, respectively.

In addition, the cam C1 is afforded for actuating the lever 179 to effect additional movement of the rack bars 98 and 99 and thereby control the movement of the pick up members 121 and 122 relative to the legs 25a and 25b for purposes which will be discussed in greater detail presently.

A roller 235 is rotatably mounted on a pin 236 on the free end portion of the third leg of the T-shaped lever 179 and is held in engagement with the peripheral edge portion of the cam C1 by a tension coil spring 237 connected between the pin 236 and the rod 202, Figs. 1 and 2.

As is best seen in Fig. 6, at the initiation of a cycle of operation of my novel transfer device 20, the roller 235 is disposed in engagement with the leading end portion of the dwell 231 of the cam C1. During substantially the entire first 180° of rotation of the cam C1, the roller 235 rides on the dwell 231 and, therefore, the lever 179 and the shaft 27 remain stationary during this first 180° of operation of the cam shaft 181, whereby the pins 103 and 106, which are mounted on the plate 95, are held stationary. Thus it will be seen that, upon movement of the rack bars 98 and 99 with the transfer arm 25 during the first 180° of rotation of the cam shaft 181, the rack bars 98 and 99 are rotated around stationary pivot points. The pins 103 and 106, it will be remembered, are disposed on the plate 95 radially outside of the shaft 27 and during the time that they are held in the stationary position, are mounted in a position substantially as shown in Fig. 1, wherein the radii around which the rack bars 98 and 99 are rotated during movement of the transfer arm 25 from the position shown in Fig. 1 to the position shown in Fig. 3 become progressively shorter while those of legs 25a and 25b remain constant. With the rack bars 98 and 99 and the legs 25a and 25b constituted and arranged in this manner, it will be seen that during the counter-clockwise rotation of the legs 25a and 25b from the position shown in Fig. 1 to the position shown in Fig. 3, the racks 108 and 109 on the rack bars 98 and 99, will be moved outwardly relative to the free end portions 25aa and 25bb of the legs 25a and 25b, respectively, to thereby rotate the pinion gears 114 and 115 in a counter-clockwise direction as viewed in Fig. 1, and swing the pick up members 121 and 122 in a similar counter-clockwise direction around the free end portions 25aa and 25bb of the legs 25a and 25b from the position shown in Fig. 1 to the position shown in Fig. 3. Thus, it will be seen that during this movement of the transfer arm 25 in a counter-clockwise direction as viewed in Fig. 1, the pick up members 121 and 122 are rotated on the free end portions of the legs 25a and 25b from a position wherein they are disposed in outwardly projecting relation to the trailing edge portion of the legs 25a and 25b to a position wherein they are disposed in an outwardly projecting relation to the leading edge portion of the legs 25a and 25b.

Adjustment of the extent of movement of the rack bars 98 and 99 relative to the free end portions 25aa and 25bb of the legs 25a and 25b may be effected by adjusting the positions of the pivot pins 103 and 104 in the slots 101 and 102, respectively, adjustment of the pins 103 and 104 outwardly away from the shaft 27 tending to increase the extent of movement of the rack bars 98 and 99, and adjustment of the pins 103 and 104 inwardly toward the shaft 27 reducing such movement. By so adjusting the movement of the rack bars 98 and 99, the extent of travel of the pick up members around the pins 117 and 118 may likewise be adjusted.

When the pins 103 and 104 are disposed in proper positions in the slots 101 and 102, the pick up members 121 and 122 at the start of a cycle of operation are so disposed on the legs 25a and 25b that they are disposed over the work stations I and II, respectively, with the respective fingers 157 and 158, and 128 and 129 thereof disposed on opposite sides of a blank B and a work piece W, respectively, disposed at the work stations I and II. Likewise, when the legs 25a and 25b are disposed in the position shown in Fig. 3 at the close of the first 180° of rotation of the cam shaft 181, the pick up members 121 and 122 are disposed in operative position over the work stations II and III, respectively, in such position that respective fingers thereof are mounted on opposite sides of a blank B and a work piece W which may be disposed at the respective stations.

In a normal operation of my device and, specifically, during the first 180° of rotation of the cam shaft 181, the transfer arm 25 and associated mechanism, as has previously been discussed, and as will be discussed in greater detail hereinafter, is effective to pick up a finished work piece W from work station II and transfer the same to the work station III, and, at the same time, pick up a blank B from the work station I and transfer the same to the work station II. Thereafter, during the next 180° of rotation of the cam shaft 181, the transfer arm 25 swings back from the position shown in Fig. 3 to the position shown in Fig. 1 and disposes the pick up members 121 and 122 in position to pick up another blank B and work piece W from the work stations I and II, respectively.

As will be appreciated by those skilled in the art, during such rotation of the transfer arm 25, the free end portions 25aa and 25bb of the legs 25a and 25b, travel through an arc and if the pick up members 121 and 122 were held in stationary position relative to the free end portions 25aa and 25bb, the pick up members 121 and 122 would necessarily travel in the same arc and the free end portions thereof would travel through an accentuated arc, and would, therefore, tend to be swept laterally across the work stations II and III, respectively, in withdrawing from the position shown in Fig. 3, and would tend to be swept laterally across the work stations I and II, when approaching the position shown in Fig. 1. Inasmuch as the fingers of the pick up members 121 and 122 are disposed, or are to be disposed, around, and adjacent to work pieces and blanks at the start of these movements of the transfer arm 25 back and forth between the respective work stations, I have so constituted and arranged the parts of my novel transfer device 20 in such a manner that, when the pick up members 121 and 122 are withdrawing from positions over work stations II and III, respectively, they move in a substantially straight-line direction and when approaching the work stations I and II, respectively, they also move in a substantially straight-line direction, and thus, in both instances, do not swing in a sweeping motion laterally across the stations on which blanks B or work pieces W are positioned and thereby insure that the blanks B or work pieces W, or blanks or work pieces adjacent thereto, will not be accidentally struck by the pick up members 121 and 122.

Such straight-line movement of the pick up members 121 and 122 is readily accomplished in my novel device 20, by the mechanism including the rack bars 98 and 99. Thus, it will be seen that at the initiation of the return movement of the transfer arm 25, from the position shown in Fig. 3 to the position shown in Fig. 1, which return movement takes place during the second 180° of rotation of the cam shaft 181, the cam C1 is rotated into position wherein the roller 235 rides onto the leading edge portion of the lobe 232, and, during substantially the next 45° of rotation, the lobe 232 on the cam C1 is effective to press the roller 235 downwardly to thereby rotate the lever 179 in a clockwise direction around the rod 78 and thereby rotate the plate 171, the shaft 27 and the plate 95 in a clockwise direction as viewed in Figs. 3 and 10.

The lobe 232 on the cam C1 is of such configuration that during this first 45° of the return movement of the cam shaft 181, the shaft 27 is rotated at a faster rate than the sleeve 41 and thus, it will be seen that the pins 103 and 104 are rotated relative to the transfer arm 25 from a position shown in Fig. 3, wherein they are offset from the longitudinal center lines of the legs 25a and 25b, respectively, at the start of the return movement of the transfer arm 25 to a position shown in solid lines in Fig. 10, wherein the pins 103 and 104 are disposed substantially on the center lines of the legs 25a and 25b. By such movement of the pins 103 and 104, the racks 108 and 109 are moved outwardly further with respect to the free end portions 25aa and 25bb of the legs 25a and 25b from the position shown in Fig. 3. This latter movement of the racks 108 and 109 is effective to further rotate the pinion gears 114 and 115 in a counter-clockwise direction and thus rotate the pick up members 121 and 122 in a counter-clockwise direction to counteract and offset the tendency of the legs 25a and 25b to swing the free end portions of the pick up members 121 and 122 clockwise in a lateral movement across the work stations II and III. In this manner, the gripping members 121 and 122 are withdrawn, during the first 45° of the last 180° of rotation of the cam shaft 181, in a substantially straight-line movement from their respective positions over the work stations II and III.

After this initial 45° of rotation of the cam shaft 181, the roller 235 rides inwardly on the trailing edge of the lobe 232 of the cam C1, and the lever 179 is thus pivoted by the spring 237 in a counter-clockwise direction on the rod 78 to thereby pivot the plate 171, the shaft 27 and the plate 95, in a counter-clockwise direction from the position shown in solid lines in Fig. 10. The trailing edge of the lobe 232 of the cam C1 is, as is best seen in Fig. 6, curved outwardly only slightly from a flat straight line shape and includes an outer end portion 241a extending from the tip of the lobe 232 to a point 242 on the trailing edge portion of the lobe 232 which is disposed a distance from the center of the cam shaft 181 substantially equal to the length of the radius of the dwell 231.

The trailing edge of the lobe 232 also includes an inner end portion 241b substantially comprising a chord to an arc of the circle of the dwell 231 and connecting the point 242 on the trailing edge portion of the lobe 232 with the leading end portion of the dwell 231.

The outer end portion 241a of the trailing edge of the lobe 232 is of such length that upon continued rotation of substantially 35° from the end of the aforementioned first 45° of the second 180° of rotation of the cam shaft 181, the cam C1 has been moved so that the roller 235 has moved upwardly from engagement with the tip of the lobe 232 into engagement with the point 242 on the trailing edge portion of the lobe 232. At this point in the return movement of the transfer arm 25, it will be seen that the roller 235 has moved back to a position the same distance away from the cam shaft 181 as it was when it occupied the initial position, shown in Fig. 6, at the start of the cycle of operation shown in Fig. 6, and, thus, the pins 103 and 104 have been moved back to the same position relative to the housing 26 as is shown in Fig. 1.

This movement of the pins 103 and 104 from the positions shown in solid lines in Fig. 10, to the position shown in Fig. 1, together with the rotation of the transfer arm 25 in a clockwise direction around the shaft 27, is effective to move the rack bars 98 and 99 inwardly from the free end portions 25aa and 25bb of the legs 25a and 25b, from the position shown in solid lines in Fig. 10 to the position shown in dotted lines in Fig. 10, to thereby rotate the pinion gears 114 and 115 in a clockwise direction on the legs 25a and 25b and, therefore, initiate rotation of the pick up members 121 and 122 in a clockwise direction from the position shown in solid lines in Fig. 10 toward the position shown in Fig. 3.

If the pick up members 121 and 122 were held in fixed position relative to the free end portions 25aa and 25bb of the legs 25a and 25b during the remaining return movement of the transfer arm 25 toward stations I and II, obviously, the free end portions of the pick up members 121 and 122 would be rotated in a clockwise direction and swept laterally across the work stations I and II. However, my novel device 20 is so constructed that the pick up members 121 and 122 do not approach work stations I and II with a lateral, sweeping motion, but make the final approach to the work stations I and II in a relatively straight line movement and to accomplish this, I effect such movement of the rack bars 98 and 99, that during the final approach movement of the pick up members 121 and 122, during which the movement of the legs 25a and 25b normally tends to sweep the free end portions of the gripping members 121 and 122 in a clockwise direction across the work stations I and II, respectively, the rack bars 98 and 99 are moved relative to the legs 25a and 25b in such a direction that the pinion gears 114 and 115 are rotated in a counter-clockwise direction at the proper rate to turn the pick up members 121 and 122 sufficiently in a counter-clockwise direction to offset the movement of the free end portions of the legs 25a and 25b, and thereby move the free end portions of the pick up members 121 and 122 in substantially a straight line direction into operative position over the work stations I and II, respectively.

In this connection, it will be seen that at substantially the point in a cycle of operation whereat the cam shaft 181 has completed 315° of a complete revolution, which is the point at which the roller 235 is disposed at the mid-point between the point 242 and the point at which the inner end portion 241b of the trailing edge of the lobe 232 of the cam C1 is connected to the dwell 231, the roller 235 is disposed at that point on the inner end portion 241b of the trailing edge of the lobe 232 which approaches closest to the center of the cam shaft 181 and, thus it will be seen that during substantially the first 45° of the last 90° of rotation of the cam shaft 181, the roller 235 has been moved upwardly by the spring 237 to thereby rotate the lever 179 in a counter-clockwise direction on the shaft 78 and thus rotate the plate 171, the shaft 27 and the plate 95 in a further counter-clockwise direction, from the position shown in Fig. 1, to the position shown in dotted lines in Fig. 10. This movement of the plate 95, it will be seen also moves the pins 103 and 104 in such a manner that the rack bars 98 and 99 are pulled inwardly relative to the free end portions of the legs 25a and 25b and thereby, the pick up members 121 and 122 are swung relative to the legs 25a and 25b into the position shown in broken lines in Fig. 10.

Thereafter, it will be seen that the movement of the cam C1 with the cam shaft 181, during substantially the last 45° of a cycle of operation, is such that the roller 235 is pressed outwardly from this position at which it is disposed at the 315° point of a cycle of operation to the position shown in Fig. 6, wherein it is again engaged with the leading end of the dwell 231. This last movement of the roller 235, it will be seen, through the resultant movement of the lever 179, the plate 171, the shaft 27 and the plate 95, is effective to move the pins 103 and 104 from the position shown in broken lines in Fig. 10, to the normal position shown in Fig. 1, and is thereby effective to move the rack bars 98 and 99 outwardly relative to the free end portions of the legs 25a and 25b. This movement of the pins 103 and 104 around the shaft 27 is at such a rate that the rack bars 98 and 99 are moved outwardly at a rate wherein the outward movement of the racks 108 and 109 is sufficient to so rotate the pinion gears 114 and 115 and, therefore, the pick up members 121 and 122 sufficiently in a counter-clockwise direction that the free end portions of the pick up members 121 and 122 are carried from the position shown in broken lines in Fig. 10 to the position shown in Fig. 1, in a substantially straight line movement whereby the free end portions of the pick up members 121 and 122 are readily moved into enclosing relation to the blank B and work piece W mounted at work stations I and II, respectively, without striking the blank B and the work piece W, or adjacent devices or mechanism.

With the free end portions of the pick up members 121 and 122 moving in substantially a straight line into and out of operative positions over stations I and II, and II and III, respectively, the movement of the gripping fingers 157, 158, 128 and 129 is such that blanks B and work pieces W may be readily picked up from, and deposited on, the respective work stations with accuracy. Also, it will be seen that with my novel construction, I have eliminated the danger of the pick up members 121 and 122 accidentally striking the blank B or work piece W which has been, or is to be, transferred, or other properly located blanks B or work pieces W.

As previously mentioned, the supply conveyor belt 21 and discharge conveyor belt 23 are merely disclosed herein by way of illustration and not by way of limitation, and other types of supply devices or discharge receptacles or devices, may be used without departing from the purview of my invention. However, when using a supply conveyor belt 21, as shown in Fig. 1, I prefer to dispose a bar 245 across the head end portion of the belt 21 to thereby stop blanks B which are moved by the conveyor belt 21 into predetermined relation thereon. Adjacent to the conveyor belt 21 and in spaced parallel relation to the bar 245, a pneumatic ram 246 is mounted on a suitable table T which preferably comprises a portion of the supporting structure of the conveyor belt 21, and the ram 246, includes a plunger 247 operated by air fed into the cylinder 248 of the ram 246 by means of a suitable hose or conduit 249, Fig. 1, from a valve 251 substantially identical to the valve 159 and connected to the supply conduit 152 adjacent to the valve 159. The ram 246 may be anyone of several well-known types of air cylinders available on the market, and is so constructed that when air is fed into the cylinder 248, the plunger 247 is pushed outwardly thereby and when the air is exhausted from the conduit 249 to the atmosphere, the plunger 247 is retracted into the cylinder 248 by spring or other means, not shown.

The head end portion of the cylinder 248 from which the plunger 247 is projected and retracted is disposed adjacent to a longitudinal edge of the belt 21 in parallel spaced relation to the bar 245 in such position that when the plunger 247 is moved outwardly relative to the cylinder 248, the front end portion of the plunger 247, pushes the first blank B disposed against the bar 245 laterally across the belt 21 onto a platform 252 on the table T into the work station I. Suitable guide bars 254 are mounted on the belt 21 to hold the blanks B disposed behind this aforementioned first blank B against lateral movement across the conveyor belt 21. When the plunger 247 is retracted into the cylinder 248, the next blank B moves forwardly with the conveyor belt 21 into engagement with the bar 245 into position wherein upon the next outward movement of the plunger 247, during the next cycle of operation of the transfer device 20, this next blank B is then pushed transversely across the conveyor belt 21 into work station I.

Control of the operation of the ram 246 is effected by the cam C5, Figs. 1 and 12, the cam C5 being disposed on the cam shaft 181 adjacent to the cam C4, and having a lobe 256 and a dwell 257, Fig. 12. The lobe 256 is so disposed on the periphery on the cam C5 that during substantially the first 215° of rotation of the cam shaft 181 during a cycle of operation, the roller 258 on the valve 251, and which roller is similar to the roller 206 on the valve 159, is disposed in engagement with the dwell 257 whereby the plunger 259 on the valve 251 is disposed in outwardly projecting or, in other words, in valve closing position, to thereby close the valve against the passage of air from the conduit 152, into the ram 246 and to open the valve 251 to vent the line 249 to atmosphere. At the end of substantially the first 215° of rotation of the cam shaft 181 in a cycle of operation, the leading edge portion 262 of the lobe 256 on the cam C5 is moved into engagement with the roller 258 and within preferably the next 5° of rotation of the cam C5, the roller 258 is pressed downwardly by the lobe 256 and is held in such downwardly disposed, or, in other words, valve opening position, until substantially 5° before the completion of a full rotation of the cam shaft 181, at which time the roller 258 moves inwardly along the trailing edge 263 of the cam 256 into the normal position on the dwell 257. During this time that the roller 258 is held in downwardly disposed position by the lobe 256, the valve 251 is, of course, in open position and is effective to feed compressed air from the conduit 152 through the valve 258 and the line 249 to the ram 246 and thus actuate the plunger 247 and push a blank B into work station I. Upon movement of the roller 258 downwardly along the trailing edge 263 of the lobe 256, the plunger 259, Fig. 13, is again moved upwardly to thereby close the valve 251. Thus, it will be seen that during a cycle of operation of my novel device 20, after a blank B has been picked up from the panel 252 of the table T, for transfer to the die D of the punch press 22, the ram 246 is actuated to thereby position a new blank B at station I for transfer to the die D, or in other words, the work station II, during the next cycle of operation.

As previously mentioned, one of the primary purposes of my invention is to afford a novel material handling device which may be used with various types of machinery, such as, the punch press 22 and the like, and wherein the material handling device may be used in conjunction with such machines to eliminate the dangerous manual handling of blanks which must be fed to such machines and work pieces which must be removed from the machines. If, of course, such a device is to be successful, it must be so constructed and arranged that it may be reliably operated in timed relation to the operation of the machine with which it is to be used, and, as previously mentioned, another primary purpose of my invention is to enable such a machine to embody control devices which will automatically, and in a novel and expeditious manner, control not only the operation of the devices, but also the operation of the machine with which the device is to be used.

For the purpose of controlling the operation of the machine with which my novel transfer device 20 is associated I have embodied control mechanism in the transfer device 20 which includes the cam C6 which is mounted on the cam shaft 181, adjacent to the cam C5 and comprises a lobe 265 and an inwardly disposed substantially circular shaped dwell 266. Also included is a valve 270 mounted in the housing 26 adajacent to the valve 251. Like the valve 251, the valve 270 is substantially the same as the valve 150 and includes a roller 268 mounted on a pivotally mounted lever 269 which is effective to actuate the plunger 272 of the valve 270.

The lobe 265 may, of course, be of any size and extent desired, but for the purpose of actuating a machine such as the punch press 22, the lobe 265 is relatively short and is so disposed on the dwell 266 that during substantially the first 245° of rotation of the cam C6, the roller 268 rides on the dwell 266. At the completion of the first 245° of rotation of cam C6 and the cam shaft 181 in the cycle of operation, the leading edge 271 of the lobe 265 engages the roller 268, to thereby press the lever 269 downwardly to open the valve 270 and permit air to pass from the conduit 152 through the valve 270 into the line 273 connected between the valve 270 and a suitable control device 275, on the punch press 22.

The control device 275 on the punch press 22 may be any one of several types of pneumatic controls well known in the art, whereby air fed into the control device 275 through the conduit 273 is effective to initiate an operation of the punch press 22. The punch press 22 may be of the one-cycle-of-operation type which is well known to those skilled in the art and which embodies control means such as a one-revolution clutch, or the like, whereby the punch press 22 passes through but a single cycle of operation for each actuation of the control device 275.

The lobe 265 on the cam C6 is preferably just of sufficient length that a positive actuation of the valve 270 is accomplished thereby which is effective to actuate the control device 275 and thereby set the punch press 22 into operation. As previously mentioned, suitable means, such as, for example, a one-revolution clutch may be embodied in the punch press, 22, as is usual, whereby upon release of the control device 275, the punch press will pass through one cycle of operation and stop.

The length of the lobe 265 as shown in the drawings is such that the lever 269 is held in valve opening position for substantially 45°, from a point in a cycle of operation at which the cam shaft 181, has passed through 245° to a point wherein the cam shaft has passed through substantially 290°. Thus, it will be seen that at the start and finish of a cycle of operation, the roller 268 is disposed in engagement with the dwell 266 on the cam C6 and the valve 270 is closed to thereby close the passageway from the conduit 152 into the conduit 273 and vent the conduit 273, and therefore, the control device 275 to the atmosphere.

It will be seen that a timing chart showing the relationship of the operation of the various devices controlled by the cams C1-C6 is included herein as Fig. 17. The timing chart, Fig. 17, is arranged to illustrate a single complete cycle of operation of the transfer device 20, being based on a complete revolution of the cam shaft 181 from substantially the position shown in Fig. 6, and showing the relative times at which each of the cams C1-C6 perform their various operations during the rotation of the cam shaft 181 or, in other words, during the cycle of operation of the transfer device 20.

*Résumé of the operation of the material handling device 20 shown in Figs. 1 to 17, inclusive*

In a typical operation of the material handling device 20 shown in the accompanying drawings to illustrate a preferred embodiment of my invention, the material handling device 20 is used to transfer blanks B from station I, adjacent the supply conveyor belt 21, to a station II, shown in the drawings as being the die D of the punch press 22, and thereafter, after completion of a punching operation of the punch press 22 on the blank B, thus deposited on the die D, the finished work piece W is transferred by the material handling device 20 from work station II to work station III, this latter work station being illustrated as a discharge conveyor belt 23 whereby the finished work pieces W may be carried away from the punch press 22 to a subsequent work station, or to a suitable receiving receptacle, storage place or the like. In addition, during the transfer of the blanks B from the station I to the station II and the simultaneous transferring of finished work pieces W from station II to station III, operation of the punch press 22 is effected and controlled by suitable mechanism including the cam C6 embodied in the material handling device 20, whereby the punch press 22 is operated in proper timed relation to the operation of the transfer device 20.

During such a typical operation of the material handling device 20, the cam shaft 181 revolves through a single complete rotation to thereby revolve the cams C1-C6 through a single complete rotation from the position shown in Fig. 6 back to the position shown in Fig. 6.

It will be remembered that at the start of a cycle of operation, the transfer arm 25 is disposed in the position shown in Fig. 1, and the cams C1-C6 are disposed in the position shown in Figs. 6 and 10. The motor 189, acting through the worm wheel 186 and the worm 188, is effective to rotate the cam shaft 181 in a clockwise direction, as viewed in Figs. 6 and 8, and upon initiation of a cycle of operation, the cam C4 is effective to close the fingers 157 and 158 of the pick up member 121 on a blank B positioned by the ram 246 at station I, during the preceding cycle of operation. At this same time the fingers 128 and 129 on the pick up member 122 are likewise closed onto a finished work piece W on the die D of the punch press 22, this closing of the fingers of the pick up members 121 and 122 preferably takes place within the first 2° or 3° of rotation of the cam shaft 181. During this closing movement of the fingers of the gripping members 121 and 122, the cam C2 acting through the lever 75, is effective to start raising the sleeve 41, the transfer arm 25, and, therefore, the pick up members 121 and 122 from the position shown in Fig. 6 to the elevated position shown in Fig. 8. This raising movement of the transfer arm 25 is effected during the first 5° of rotation of the cam shaft 181. Thus, it will be seen that as soon as the gripping members 121 and 122 are first closed on the blank B and the work piece W, respectively, these articles are raised, by the upward movement of the transfer arm 25, above the platform 252 and the die D, at work stations I and II, respectively.

During this aforementioned movement of the cams 1 and 2, the cam C3 has, through the movement of the lever 193 and the sleeve 41, initiated counter-clockwise rotation of the transfer arm 25 from the position shown in Fig. 1 to the position shown in Fig. 3. This movement of the transfer arm 25 continues for the first 180° of rotation of the cam shaft 181, but the rate of movement of the transfer arm 25 slows appreciably during the last 20° of this first 180° of rotation of the cam shaft 181 because the roller 195 enters onto the base 196 of the cam C3, whereby the final movement of the blank B and work piece W laterally into work stations II and III is at a relatively slow rate and the transferred articles may be accurately discharged onto the work stations II and III.

During this rotation of the transfer arm 25 from the position shown in Fig. 1 to the position shown in Fig. 3, the shaft 27 remains stationary, whereby the rack bars 98 and 99 are rotated around shorter radii about the legs 25a and 25b of the transfer arm 25, and, therefore, counterclockwise rotation of the gripping members 121 and 122 is effected to thereby swing the gripping members on the free end portions 25aa and 25bb of the legs 25a and 25b from the position shown in Fig. 1 to the position shown in Fig. 3 so that at the completion of the first 180° of rotation of the cam shaft 181, the free end portion of the gripping member 121 is disposed in position over the work station II and the free end portion of the gripping member 122 is disposed in position over the work station III.

Just prior to the completion of the first 180° of rotation of the cam shaft 181 and preferably during the latter 5° thereof, the roller 221 rides inwardly along the trailing edge 227 of the lobe 226 on the cam C2 onto the dwell 224, to thereby lower the sleeve 41 and, therefore, the transfer arm 25 and the gripping members 121 and 122 onto the normal lowered position. At the end of the lowering movement of the transfer arm 25 and the gripping members 121 and 122, and preferably during the last 2° of the first 180° of rotation of the cam shaft 181, the roller 206 on the lever 207 of the valve 150 rides inwardly along the trailing edge 219 of the lobe 205 of the cam C4 onto the dwell 218 to thereby effect closing of the valve 150 and release the air cylinders 163 and 145, and thereby open the pick up members 121 and 122 and release the blank B and the work piece W on the die D at station II, and on the conveyor belt 23 at station III, respectively. The opening of the pick up members 121 and 122 is so timed that the blank B and the work piece W are deposited gently and accurately in predetermined position on the die D and the discharge conveyor belt 23, respectively.

During the next 180° of rotation of the cam shaft 181, the roller 195 on the lever 193 is pressed downwardly by the cam C3 from the position shown in Fig. 8 toward the position shown in Fig. 6. The rate at which the roller 195 is pressed down during the first 20° of this latter 180° of rotation of the cam shaft 181, and during which time the roller 195 is disposed in engagement with the other side of the dwell 196, is somewhat slower than the substantially constant rate at which the roller 195 is pushed downwardly by the lobe 197 on the cam C3 during the last 160° of the last 180° of rotation of the cam shaft C3.

It will be remembered that at the initiation of the last 180° of rotation of the cam shaft 181, the pick up members 121 and 122 are disposed in open position, and, therefore, it will be seen that the clockwise rotation of the transfer arm 25 from the position shown in Fig. 1 toward the position shown in Fig. 3, is effective to move the gripping members 121 and 122 away from the blank B and the work piece W disposed on the work stations II and III, respectively. To insure that the gripping members 121 and 122 will move away from the work stations II and III, in a minimum of space and in a substantially straight line movement, to thereby avoid striking the blank B or the work piece W, the cam C1 presses the roller 235 on the lever 179 downwardly, as viewed in Fig. 8, during the first 45° of this latter 180° of rotation of the cam shaft 181. This operation of the cam C1 is effective through the lever 179, the plate 171, the shaft 27, and the plate 95, to move the rack bars 98 and 99 in such a direction relative to the free end portions 25aa and 25bb of the legs 25a and 25b of the transfer arm 25, that, during this 45° of the cam shaft 181, the gripping members 121 and 122 are rotated in a counterclockwise direction relative to the free end porions 25aa and 25bb, of the legs 25a and 25b, respectively, sufficiently that the tendency of the legs 25a and 25b to carry the free end portions of the gripping members 121 and 122 in an arc is offset so that the free end portions of the gripping members 121 and 122 are retracted from positions around the blank B and the work piece W, disposed at the respective stations II and III, in a substantially straight line movement.

Thereafter, the roller 235 on the lever 179 rides across the outer end portion 241a of the trailing edge of the lobe 232 of the cam C1 to the point 242 thereon, Fig. 6, to thereby return the roller 235 to substantially the same position relative to the cam shaft 181 shown in Fig. 6, at a point in the cycle of operation wherein the cam shaft 181 has completed substantially 270° of rotation. This movement, it will be seen, is effective to move the pins 103 and 104 from the positions shown in solid lines in Fig. 10 to the positions shown in Fig. 1.

After reaching the point 242 on the cam C1, the roller 195 moves on across the front half of inner end portion 241b of the trailing edge of the cam 232 to the position shown in broken lines in Fig. 11, to thereby move the lever 195 upwardly from the position shown in Fig. 6 to that shown in dotted lines in Fig. 11. This movement of the roller 235 and, therefore, of the lever 179, is effective to move the pins 103 and 104 from the position shown in Fig. 1 to the position shown in broken lines in Fig. 10.

The movement of the pins 103 and 104 from the positions shown in solid lines to the positions shown in broken lines in Fig. 10, together with the movement of the transfer arm 25 around the shaft 27 is effective to swing the pick up members 121 and 122 in a clockwise direction on the free end portions 25aa and 25bb on the legs 25a and 25b from the position shown in solid lines in Fig. 10 to the position shown in dotted lines in Fig. 10. This rotation of the pick up members 121 and 122 relative to the legs 25a and 25b, respectively, is completed at a point in the cycle of operation wherein the cam shaft 181 has completed substantially 315° of a complete rotation.

Thereafter, the trailing end of the inner end portion 241b of the trailing edge of the lobe 232 of the cam C1, is effective to press the roller 235, and, therefore, the lever 179, outwardly, or in a clockwise direction as viewed in Fig. 6, from the position shown in broken lines in Fig. 11 back to the position shown in Fig. 6. This latter movement of the roller 235, and therefore, of the lever 179, the plate 171, the shaft 27 and the plate 95, is effective to move the rack bars 98 and 99 outwardly relative to the legs 25a and 25b of the transfer arm 25, a sufficient distance and at a sufficient rate, to offset the tendency of the transfer arm 25 to sweep the free end portion of the pick up members 121 and 122, transversely across work stations I and II, respectively, so that the pick up members 121 and 122 are moved in substantially a straight-line movement from the position shown in broken lines in Fig. 10, to the position shown in Fig. 1, during the last 45° of the complete rotation of the cam shaft 181.

During the return movement of the transfer arm 25 from the position shown in Fig. 1 to the position shown in Fig. 3, and, preferably, at a point in a cycle of operation wherein the cam shaft 181 has moved through substantially 215°, the cam C5 has been effective to open valve 251 and thereby actuate the ram 246 to feed a new blank B from engagement with the bar 245 into the proper predetermined position on the panel 252 of the table T at work station I. Thereafter, and preferably during substantially the last 5° of the single rotation of the cam shaft 181, the cam C5 permits the valve 251 to close to thereby retract the plunger 247 and permit the next blank B to be fed by the conveyor belt 21 into engagement with the bar 245 into position wherein upon actuation of the ram 246, during the next cycle of operation, the blank may be fed into position at work station I.

Also, during the return movement of the transfer arm 25 from the position shown in Fig. 1 to the position shown in Fig. 3, the cam C6 has been effective, from a point at substantially 245° to a point at substantially 290° of a complete rotation of the cam shaft 181, to open the valve 270 to thereby actuate the control mechanism 275 of the punch press 22 and thereby cause the punch press 22 to pass through a single cycle of operation wherein the blank B which had been disposed on the die D is operated upon and changed into a work piece W.

From the foregoing, it will be seen that I have afforded a novel material handling device which may be used with machines, such as, for example, punch presses and the like, in a manner whereby material may be fed to the machine and the finished work pieces be removed from the machine without requiring the insertion of human hands or the like into the working parts of such a machine. Also, it will be seen that such a device may be constructed and used as a unit in connection with such a machine, and it is especially well adapted for feeding blanks to punch presses and the like in operations such as, for example, operations for forming shell cases, or the like, from blanks fed into the punch press.

*Modified form of transfer device shown in Figs. 18 to 20*

The modified form of my device which I have shown in Figs. 18 to 20 operates on the same principle as the preferred form of the device illustrated in Figs. 1 to 17, inclusive, and like reference numerals have been used on like parts, and the same reference numerals with the suffix "m" have been used on parts which are similar but which have been substituted for parts of the preferred form of my invention. All the changes made in the modified form of my invention over the preferred form, as shown, are embodied in the pick up members 121 and 122 attached to the legs 25a and 25b of the transfer arm 25.

It will be noted that the changes made in the modified form of my invention comprise the following: the pick up members 121 and 122 have been eliminated in the modified form of my invention and pick up members such as the pick up member 121m have been substituted therefor; the air cylinder 163 has been moved from the substantially horizontally extending position shown in Fig. 3 to the substantially vertically extending position on the plate 162 shown in Fig. 18; the air ram 246 has been eliminated; the tube 249 previously connected to the ram 246 has been connected to the air cylinder 163; the cam C5 has been replaced by the cam C5m; the air line 169 has been removed from the air cylinder 163 and connected to the pick up finger 306; and the valve 150 has been disconnected from the compressed air conduit 152 and connected to a suitable suction device such as a vacuum pump, not shown.

The pick up member 121m includes an elongated lever 301 pivotally mounted on a bracket 302 on the plate 162. A tension coil spring 311 is connected between one end portion of the lever 301 and the plate 162 and yieldingly urges the lever 301 to rotate in a counter-clockwise direction as viewed in Fig. 18. The plunger 165 of the air cylinder 163 engages one end portion 305 of the lever 301 between the spring 311 and the bracket 302 and is effective upon actuation of the air cylinder 163 to move the lever 301 in a clockwise direction against the urging of the spring 311.

The pick up finger 306 comprises a hollow tube 307 mounted in and extending through the other end portion 310 of the lever 301, opposite to the end on which the spring 311 is mounted, and a cup shaped head 308 mounted on the lower end portion of the tube 310. The conduit 169 is connected to the upper end portion of the tube 310.

The blanks Bm which are to be picked up and transported by the pick up member 121m are flat plates or discs; the pick up finger 306 comprises a suction device wherein when air is drawn through the tube 310 into the conduit 249 and the head or cup 308 is disposed on the flat upper surface of one of the blanks Bm, the blank Bm may be picked up by the pick up finger 306.

In the operation of the modified form of my device, the cam C5m is effective to actuate the air cylinder 163 at the start of a cycle of operation to thereby lower the head 308 into engagement with the top blank Bm in a stack of blanks mounted in a suitable magazine M at station I. At the same time, the cam C4 is effective to open the valve 150 to thereby exhaust the air in the head 308 and hold the thus engaged blank Bm against the lower face of the head 308 by means of the vacuum created. After substantially 30° of the first 180° of rotation of the cam shaft 181, the roller 258 rides off from the lobe 256m onto the dwell 257m of the cam C5m to thereby raise the head 308 to normal position.

During the last 2° or 3° of the first 180° of rotation of the cam shaft 181, the roller 204 rides off from the lobe 205 of the cam C4 onto the dwell 218 to thereby close the valve 150 and open the pick up finger 306 to the atmosphere and thereby cause the pick up finger 306 to release the blank Bm.

During the last 180° of rotation of the cam shaft 181 in a cycle of operation, the pick up member 121m is again returned to the position shown in Fig. 18.

It will be appreciated that a pick up member similar to the pick up member 121m would be mounted on the arm 25b of the modified form of my transfer device 20, and that this second pick up member would be connected to the valves 150 and 251 in the same manner as the pick up member 121m.

From the foregoing it will be seen that I have afforded a novel transfer device which is compact in construction, reliable and efficient in operation, may be readily and economically produced commercially, and is constructed and operable in a novel and expeditious manner.

Also, it will be noted that the present invention accomplishes its intended objects, some of which have been specifically referred to hereinbefore and others of which will be apparent from the foregoing description taken in conjunction with the accompanying drawings.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A transfer device for transferring articles between a plurality of stations and comprising a base, two pick up members each operable to holdingly engage and release such an article, a transfer arm pivotally connected to said pick up members, said pick up members being mounted on said transfer arm in horizontally spaced relation to each other, a shaft mounted on and projecting upwardly from said base, a sleeve rotatably mounted on said shaft and operatively connected to said transfer arm, two rack bars movably mounted on said transfer arm, each of said rack bars being operatively connected to a respective one of said pick up members and operable upon relative movement between said rack bars and said transfer arm longitudinally of said rack bars to pivot said pick up members relative to said transfer arm, means including said sleeve for oscillating said transfer arm through a predetermined movement, and means including said shaft for moving said rack bars and said transfer arm relative to each other longitudinally of said rack bars in one direction and then in the other direction during said oscillation of said transfer arm to thereby oscillate said pick up members between a position on one side of predetermined portions of said transfer arm to a position on the opposite side of said predetermined portions of said transfer arm.

2. A transfer device for transferring articles between a plurality of stations and comprising a base, a shaft mounted on and projecting upwardly from said base, a sleeve rotatably mounted on said shaft, two pick up members adapted to be operably actuated to grasp and release such articles operatively engaged by said pick up members, a transfer arm mounted on said sleeve and pivotally connected to said pick up members, said pick up members being mounted on said transfer arm in horizontally spaced relation to each other, a cam shaft rotatably mounted on said base and operatively connected to said shaft and said sleeve, means including said cam shaft and said sleeve for oscillating said transfer arm on said shaft through a predetermined movement, and means including said cam shaft and said first mentioned shaft for pivoting said pick up members on said transfer arm to thereby disposed said pick up members in position over said stations at opposite extremities of said movement of said transfer arm.

3. A transfer device for transferring articles between a plurality of stations and comprising a base, a shaft mounted on and projecting upwardly from said base, a sleeve rotatably mounted on said shaft, two pick up members adapted to be operably actuated to grasp and release such articles operatively engaged by said pick up members, a transfer arm mounted on said sleeve and pivotally connected to said pick up members, said pick up members being mounted on said transfer arm in horizontally spaced relation to each other, a cam shaft rotatably mounted on said base and operatively connected to said shaft and said sleeve, means including said cam shaft and said sleeve for oscillating said transfer arm on said shaft through a predetermined movement, means including said cam shaft and said first mentioned shaft for pivoting said pick up members on said transfer arm to thereby disposed said pick up members in position over said stations at opposite extremities of said movement of said transfer arm, and means including said cam shaft and operatively connected to said pick up members for operatively actuating said pick up members in timed relation to said movement of said transfer arm to grasp such articles positioned at said stations at one extremity of said movement and release said grasped articles at the other extremity of said movement.

4. The transfer device defined in claim 2 and in which said means for pivoting said pick up members includes a plate mounted on said shaft, a lever pivotally mounted on said base and having one end connected to said plate, and a cam mounted on said cam shaft and operatively connected to said lever for oscillating said plate upon rotation of said cam shaft.

5. The transfer device defined in claim 3 and in which said means for operatively actuating said pick up members includes air cylinders mounted on said transfer arm and operatively connected to said pick up members, a valve mounted on said base and operatively connected to said air cylinders and a source of compressed air, and a cam mounted on said cam shaft and operatively connected to said valve for opening and closing said valve and thereby controlling the actuation of said air cylinders and said pick up members.

6. A transfer device for transferring articles between article-receiving stations and an article-discharging station, said transfer device comprising a base, a shaft rotatably mounted on said base and projecting upwardly therefrom, an elongated member slidably and rotatably mounted on said shaft, a transfer arm mounted on said elongated member for movement therewith, said transfer arm having two leg members, means including a cam shaft rotatably mounted on said base and operatively connected to said elongated member for oscillating said elongated member and said transfer arm to thereby oscillate each of said legs between a respective receiving station and a respective discharge station, means including pick up members mounted on said legs and operable to pick up such articles from said receiving stations and release said articles at said discharge stations during said oscillation of said legs, means, including a cam mounted on said cam shaft and operatively connected to said elongated member, for receiprocating said elongated member in timed relation to said oscillation of said transfer arm to thereby raise and lower said transfer arm in timed relation to said oscillation of said legs and thereby raise said pick up members over said receiving stations and lower said pick up members over said discharge stations, and means including said first mentioned shaft for rotating said pick up members relative to said legs in timed relation to said oscillation of said transfer arm to thereby move said pick up members in substantially a straight-line movement into position over said receiving stations and out of position over said discharge stations during said oscillation of said legs.

7. A transfer device for transferring articles between article-receiving stations and an article-discharging station, said transfer device comprising a base, a shaft rotatably mounted on said base and projecting upwardly therefrom, an elongated member slidably and rotatably mounted on said shaft, a transfer arm mounted on said elongated member for movement therewith, said transfer arm having two leg members, means including a cam shaft rotatably mounted on said base and operatively connected to said elongated member for oscillating said elongated member and said transfer arm to thereby oscillate each of said legs between a respective receiving station and a respective discharge station, means including pick up members mounted on said legs and operable to pick up such articles from said receiving stations and release said articles at said discharge stations during said oscillation of said legs, means, including a cam mounted on said cam shaft and operatively connected to said elongated member, for reciprocating said elongated member in timed relation to said oscillation of said transfer arm to thereby raise and lower said transfer arm in timed relation to said oscillation of said legs and thereby raise said pick up members over said receiving stations and lower said pick up members over said discharge stations, means operatively connected to said first mentioned shaft and said pick up members for rotating said pick up members relative to said legs during said oscillation of said transfer arm, and means including a cam mounted on said cam shaft and operatively connected to said first mentioned shaft, for rotating said shaft and thereby controlling the operation of said means for rotating said first mentioned shaft to thereby move said pick up members, in substantially a straight-line movement into position over said receiving stations and out of position over said discharge stations during said oscillation of said legs.

8. A transfer device for transferring articles between article-receiving stations and an article-discharging station, said transfer device comprising a base, a shaft rotatably mounted on said base and projecting upwardly therefrom, an elongated member slidably and rotatably mounted on said base and projecting upwardly therefrom, a transfer arm mounted on said elongated member for movement therewith, said transfer arm having two leg members, means including a cam shaft rotatably mounted on said base and operatively connected to said elongated member for oscillating said elongated member and said transfer arm to thereby oscillate each of said legs between a respective receiving station and a respective discharge station, means including pick up members mounted on said legs and operable to pick up such articles from said receiving stations and release said articles at said discharge stations during said oscillation of said legs, means, including a cam mounted on said cam shaft and operatively connected to said elongated member, for reciprocating said elongated member in timed relation to said oscillation of said transfer arm to thereby raise and lower said transfer arm in timed relation to said oscillation of said legs and thereby raise said pick up members over said receiving stations and lower said pick up members over said discharge stations, and means for moving said pick up members in a substantially straight-line movement into position over said receiving stations and out of position over said discharge stations during said oscillation of said legs, said last named means comprising rack bars mounted on said first mentioned shaft and operatively connected to said pick up members, said rack bars being operable upon relative movement of said rack bars and said legs longitudinally of said rack bars to rotate said pick up members relative to said legs, and means including a cam mounted on said cam shaft and operatively connected to said first mentioned shaft for rotating said first mentioned shaft in timed relation to said means for rotating said elongated member to thereby move said rack bars relative to said legs in timed relation to said last named means.

9. A transfer device for transferring articles between a plurality of stations and comprising a base, two shafts mounted on and projecting from said base in telescoping relation to each other, two pick-up members adapted to be operably actuated to pick up and release such articles as are operatively engaged by said pick-up members, a transfer arm mounted on one of said shafts and pivotally connected to said pick-up members, said pick-up members being mounted on said transfer arm in horizontally spaced relation to each other, drive means rotatably mounted on said base and operatively connected to said two shafts for rotating the same, means comprising said drive means and said one shaft for oscillating said transfer arm through a predetermined movement and means comprising said drive means and the other of said shafts for pivoting said pick-up members on said transfer arm to thereby dispose said pick-up members in position over said stations at opposite extremities of said movement of said transfer arm.

10. The transfer device defined in claim 9 and in which said means for pivoting said pick-up members includes connecting members operatively connected to said other shaft and said pick-up means and operable upon reciprocation of said connecting members relative to said transfer arm to so pivot said pick-up members on said transfer arm, said connecting members being reciprocable relative to said transfer arm upon rotation of said shafts relative to each other, and in which said drive means is operable to rotate both of said shafts in such timed relation to each other that said pick-up members are moved into and out of position over said stations in substantially straight-line movements.

11. A transfer device for transferring articles between article-receiving and article-discharging stations, said transfer device comprising a base, two shafts rotatably mounted on said base and projecting therefrom in telescoping relation to each other, a transfer arm mounted on one of said shafts for movement therewith, said transfer arm having two legs, driving means mounted on said base and operatively connected to said one shaft for oscillating said one shaft and said transfer arm to thereby oscillate each of said legs between a respective receiving station and a respective discharging station, means including pick-up members mounted on said legs and operable to pick up such articles from said receiving stations and release said articles at said discharge stations during said oscillation of said legs, actuating means operatively connected to said driving means and said one shaft for reciprocating said shaft longitudinally in timed relation to said oscillation of said transfer arm to thereby raise and lower said transfer arm in timed relation to said oscillation of said legs and thereby raise said pick-up members over said receiving stations and lower said pick-up members over said discharge stations, and means for moving said pick-up members in a substantially straight-line movement into position over said receiving stations and out of position over said discharge stations during said oscillation of said legs, said last named means comprising connecting members mounted on the other of said two shafts and operatively connected to said pick-up members, said connecting members being operable upon relative movement of said connecting members and said legs along a predetermined path to rotate said pick-up members relative to said legs, and means connected to said other shaft and said driving means and operable by said driving means to rotate said other shaft in timed relation to said rotation of said one shaft to thereby move said connecting members relative to said legs in timed relation to said rotation of said one shaft.

References Cited in the file of this patent

UNITED STATES PATENTS

| Number | Name | Date |
|---|---|---|
| 1,811,832 | Mayers | June 23, 1931 |
| 1,933,226 | Smith et al. | Oct. 31, 1933 |
| 2,119,725 | Stecher | June 7, 1938 |
| 2,198,976 | Rober | Apr. 30, 1940 |
| 2,253,283 | Minaker | Aug. 19, 1941 |
| 2,570,660 | Gamble | Oct. 9, 1951 |